US 9,424,498 B2

(12) United States Patent
Hosomi et al.

(10) Patent No.: US 9,424,498 B2
(45) Date of Patent: Aug. 23, 2016

(54) INFORMATION PROCESSING APPARATUS, INFORMATION PROCESSING METHOD, AND RECORDING MEDIUM FOR CONVERSION OF VENDOR-SPECIFIC PRINT DATA

(71) Applicants: Masashi Hosomi, Kanagawa (JP); Yoshinori Sochi, Tokyo (JP); Yosuke Aoki, Kanagawa (JP)

(72) Inventors: Masashi Hosomi, Kanagawa (JP); Yoshinori Sochi, Tokyo (JP); Yosuke Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/623,246

(22) Filed: Feb. 16, 2015

(65) Prior Publication Data

US 2015/0235111 A1 Aug. 20, 2015

(30) Foreign Application Priority Data

Feb. 18, 2014 (JP) .................................. 2014-028527
Feb. 10, 2015 (JP) .................................. 2015-024278

(51) Int. Cl.
*G06F 3/12* (2006.01)
*G06K 15/02* (2006.01)

(52) U.S. Cl.
CPC .......... *G06K 15/181* (2013.01); *G06K 15/1806* (2013.01)

(58) Field of Classification Search
CPC ............ G06K 15/181; G06K 15/1806; G06K 15/1815
See application file for complete search history.

(56) References Cited

U.S. PATENT DOCUMENTS

| 2008/0174818 | A1* | 7/2008 | Kanamoto | G06F 3/1204 358/1.15 |
| 2009/0268239 | A1* | 10/2009 | Kawara | G06F 3/1206 358/1.15 |
| 2009/0279125 | A1* | 11/2009 | Liu | G06F 3/1205 358/1.15 |
| 2012/0194841 | A1* | 8/2012 | Ito | G06F 3/1209 358/1.13 |
| 2012/0287463 | A1 | 11/2012 | Iida | |
| 2013/0335763 | A1* | 12/2013 | Mizutani | G06F 3/1298 358/1.13 |
| 2015/0153971 | A1* | 6/2015 | Aoki | G06F 3/1206 358/1.15 |

FOREIGN PATENT DOCUMENTS

| JP | 2009-271930 | 11/2009 |
| JP | 2012-238188 | 12/2012 |
| JP | 2013-088992 | 5/2013 |

* cited by examiner

*Primary Examiner* — Benjamin O Dulaney
(74) *Attorney, Agent, or Firm* — Duft Bornsen & Fettig LLP

(57) ABSTRACT

An information processing apparatus for generating drawing data by using a print job including print data and setting information, includes a description detection unit detecting a characteristic description included in the print data; a conversion unit converting the print data, the characteristic description, and the setting information into an instruction group; and one or more drawing data generation units generating the drawing data by executing the instruction group.

9 Claims, 26 Drawing Sheets

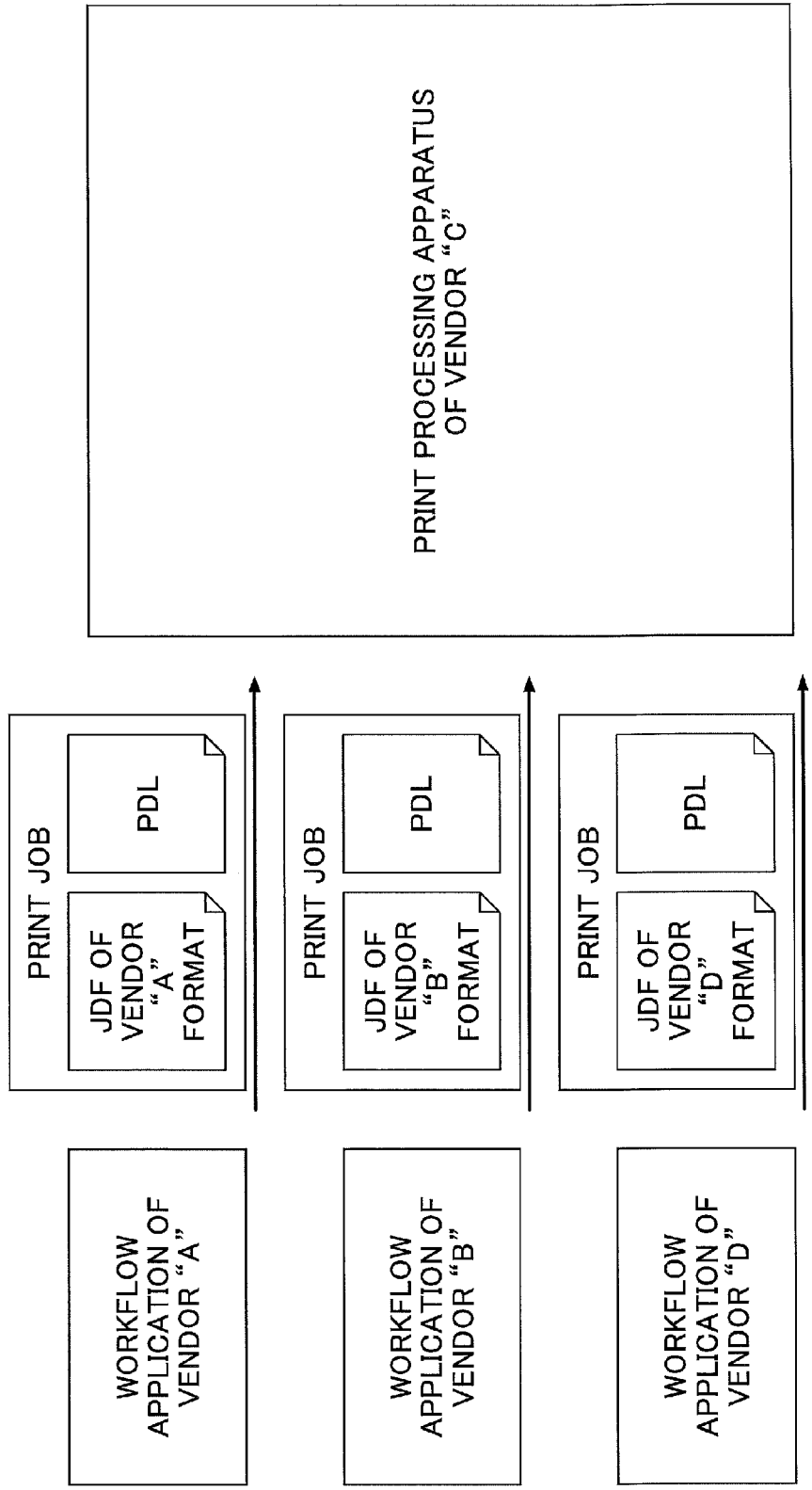

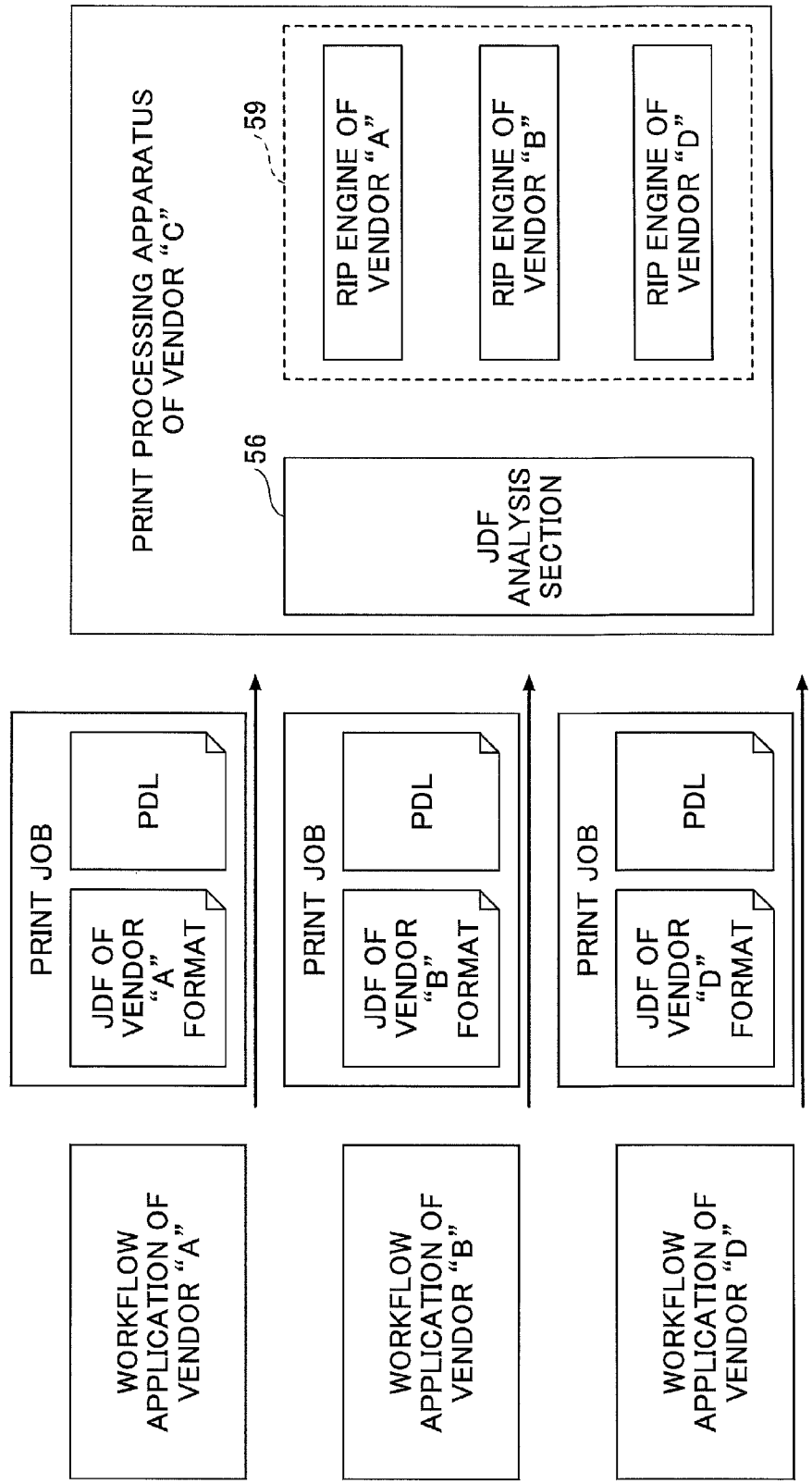

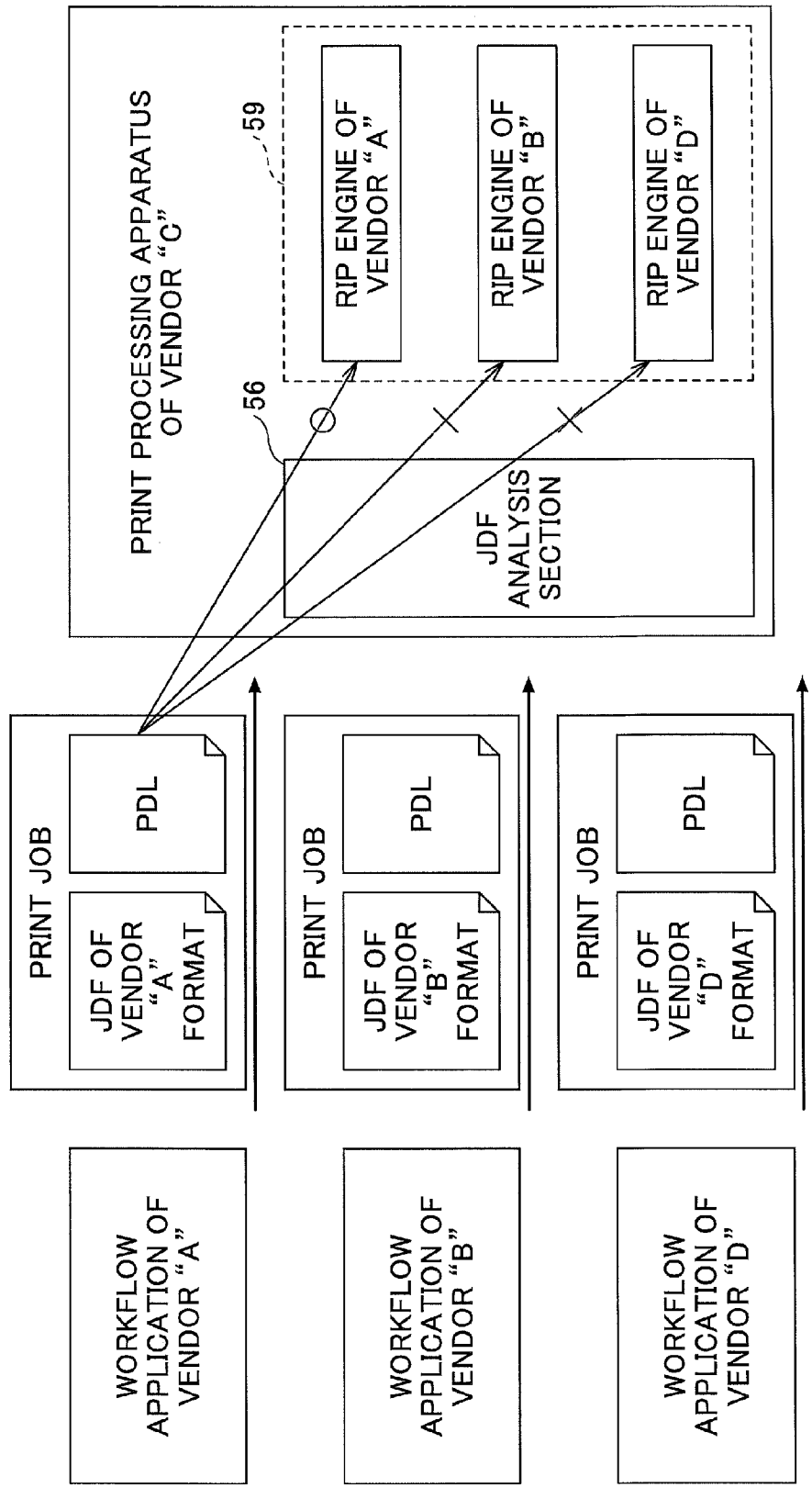

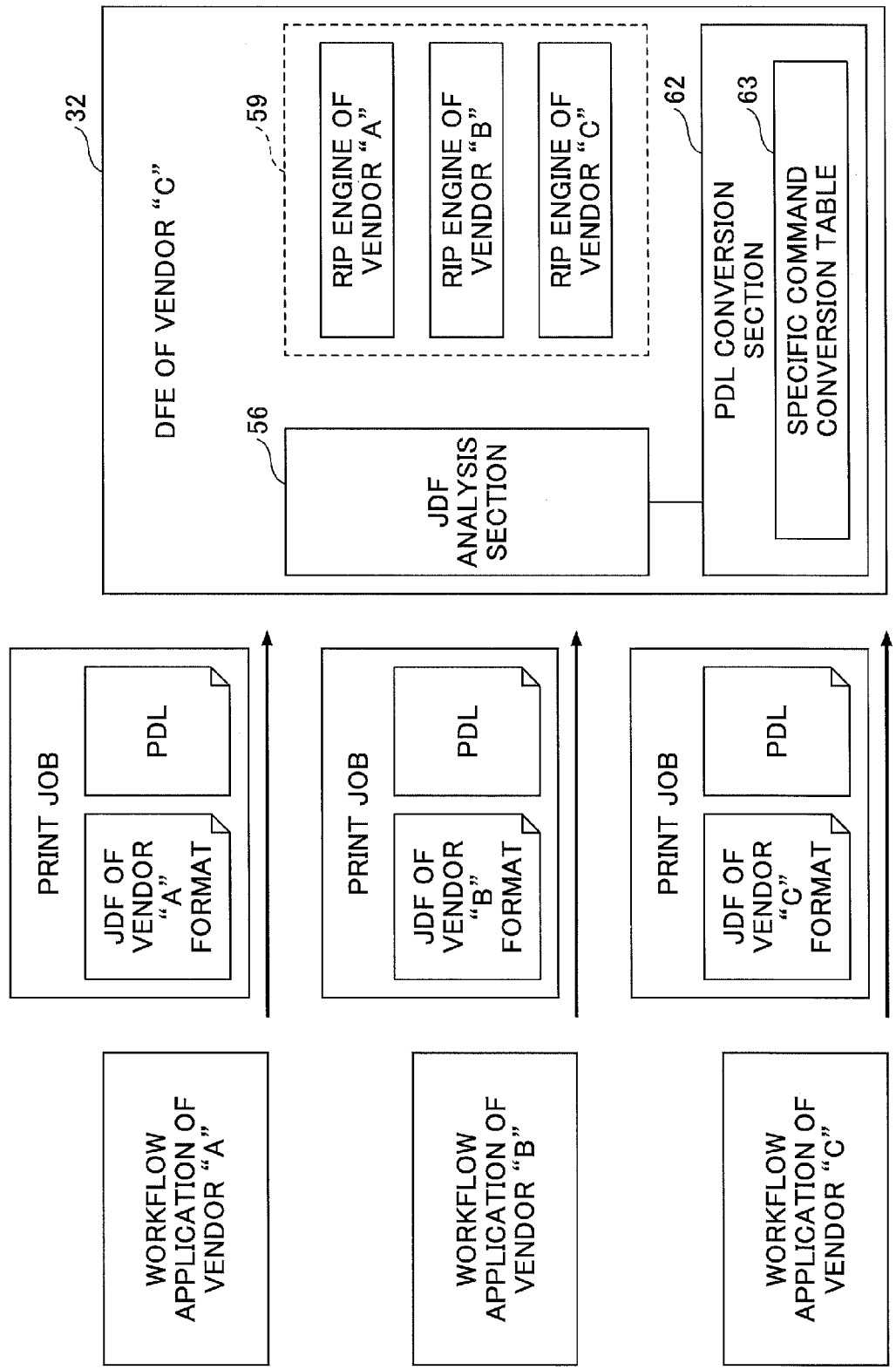

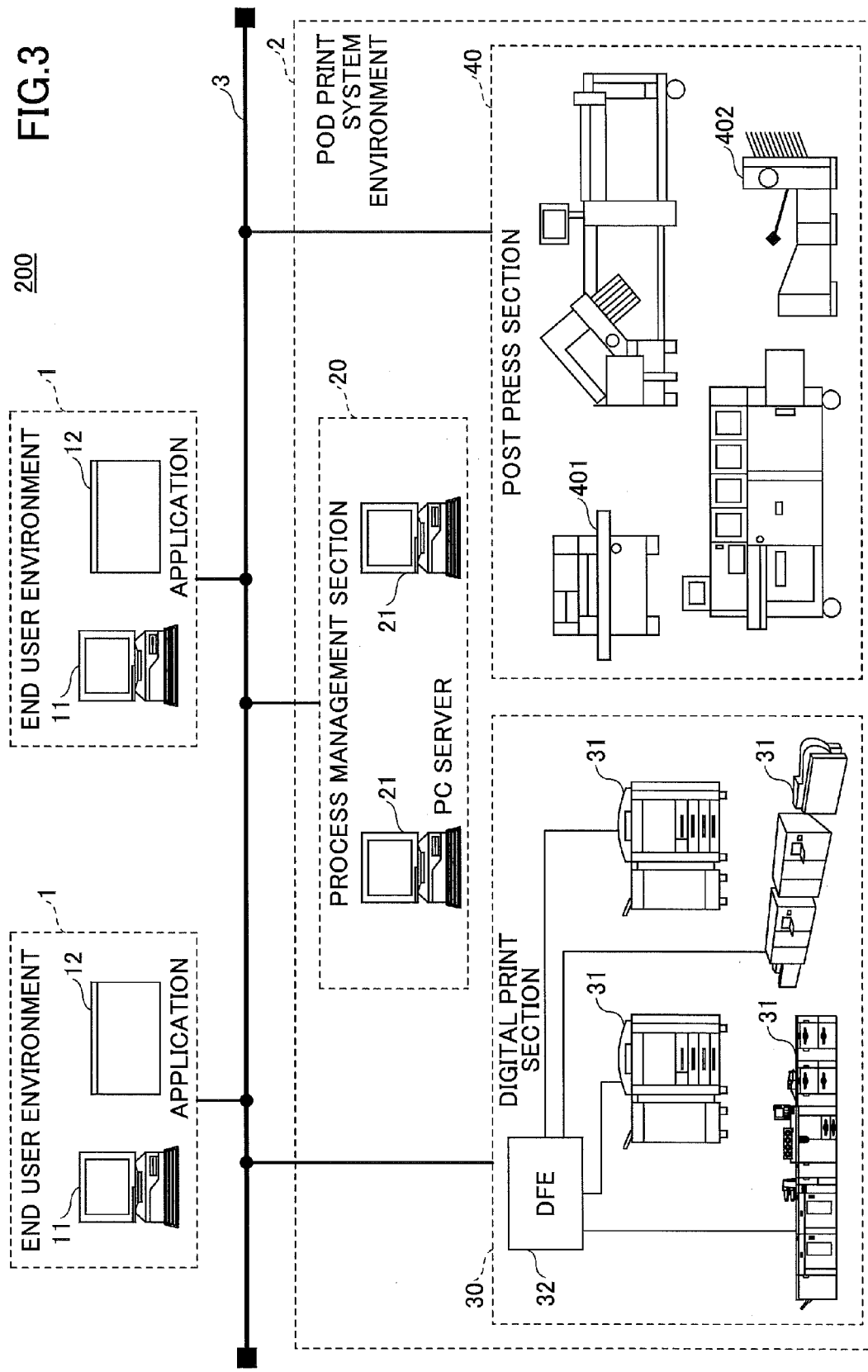

FIG.6A

```
<JDFxmlns="http://www.CIP4.org/JDFSchema_1_1" xmlns:C="www.ccc.com/schema/ccc" ...>
  <ResourcePool>
    <ComponentLink ... Amount = "2" ... />
    ...
    <LayoutPreparationParams ... Rotate = "Rotate90" ... >
    </LayoutPreparationParams>
    ...
  </ResourcePool>
</JDF>
```

FIG.6B

```
<JDFxmlns="http://www.CIP4.org/JDFSchema_1_1" xmlns:A="www.aaa.com/schema/aaa" ...>
  <ResourcePool>
    <ComponentLink ... A:Amount = "2" ... />
    ...
    <LayoutPreparationParams ... A:Rotate = "Rotate1" ... >
    </LayoutPreparationParams>
    ...
  </ResourcePool>
</JDF>
```

```
<JDF xmlns="http://www.CIP4.org/JDFSchema_1_1" xmlns:B="www.bbb.com/schema/bbb" ...>
  <ResourcePool>
    ...
    <ComponentLink ... B:DeliveryAmount = "2" ... />
    ...
    <LayoutPreparationParams ... B:AlternateRotation = "false" ... B:Rotate = "1" >
    </LayoutPreparationParams>
    ...
  </ResourcePool>
  ...
</JDF>
```

| JDF OF VENDOR "C" | | DFE-INSIDE JOB ATTRIBUTE | |
|---|---|---|---|
| ATTRIBUTE NAME | VALUE | ITEM NAME | ITEM VALUE |
| Amount | 1~32767 | CIRCULATION | 1~32767 CIRCULATIONS |
| Rotate | | ROTATION | |
| | Rotate0 | | 0° ROTATION |
| | Rotate90 | | 90° ROTATION |
| | Rotate180 | | 180° ROTATION |
| | Rotate270 | | 270° ROTATION |
| ⋮ | ⋮ | ⋮ | ⋮ |

FIG.7B

| JDF OF VENDOR "A" | | DFE-INSIDE JOB ATTRIBUTE | |
|---|---|---|---|
| ATTRIBUTE NAME | VALUE | ITEM NAME | ITEM VALUE |
| A:Amount | 1~32767 | CIRCULATION | 1~32767 CIRCULATIONS |
| A:Rotate | 1 | ROTATION | 0° ROTATION |
| | 2 | | 90° ROTATION |
| | 3 | | 180° ROTATION |
| | 4 | | 270° ROTATION |
| | ⋮ | | ⋮ |
| ⋮ | | | |

FIG.7C

| JDF OF VENDOR "B" | | DFE-INSIDE JOB ATTRIBUTE | |
|---|---|---|---|
| ATTRIBUTE NAME | VALUE | ITEM NAME | ITEM VALUE |
| B:DeliveryAmount | 1~32767 | CIRCULATION | 1~32767 CIRCULATIONS |
| B:AlternateRotation | true | ROTATION | |
| | false | | |
| B:Rotate | 1 | | 0° ROTATION |
| | 2 | | 90° ROTATION |
| | 3 | | 180° ROTATION |
| | 4 | | 270° ROTATION |
| | ⋮ | ⋮ | ⋮ |
| ⋮ | | | |

FIG.9

DFE-INSIDE JOB ATTRIBUTE

| | ITEMS | |
|---|---|---|
| JOB INFORMATION | CIRCULATION | |
| | DIRECTION INFORMATION | |
| | PRINT SURFACE INFORMATION | |
| EDIT INFORMATION | ROTATION | |
| | ENLARGE/REDUCE | |
| | IMAGE POSITION | OFFSET |
| | | POSITIONAL ADJUSTMENT INFORMATION |
| | LAYOUT INFORMATION | CUSTOM IMPOSITION LAYOUT |
| | | NUMBER OF PAGES |
| | | IMPOSITION INFORMATION |
| | | PAGE ORDER INFORMATION |
| | | CREEP POSITION ADJUSTMENT |
| | MARGIN INFORMATION | |
| | CROP MARK INFORMATION | CENTER CROP MARK INFORMATION |
| | | CORNER CROP MARK INFORMATION |
| FINISHING INFORMATION | COLLATE INFORMATION | |
| | STAPLING/BINDING INFORMATION | |
| | PUNCHING INFORMATION | |
| | CREASING INFORMATION | |
| | TRIMMING INFORMATION | |
| | OUTPUT TRAY INFORMATION | |
| | INPUT TRAY INFORMATION | |
| | COVER SHEET INFORMATION | |
| RIP CONTROL MODE (PAGE MODE OR SHEET MODE) | | |

FIG.10

RIP Parameter List DATA FORMAT

| ITEMS | | |
|---|---|---|
| INPUT/OUTPUT DATA TYPE INFORMATION | | |
| INPUT/OUTPUT DATA READ/WRITE POSITION DESIGNATION METHOD INFORMATION | | |
| INPUT/OUTPUT DATA READ/WRITE POSITIONAL INFORMATION | | |
| INPUT/OUTPUT DATA READ/WRITE EXECUTION MODE INFORMATION | | |
| UNIT INFORMATION (DIMENSION) | | |
| INPUT/OUTPUT DATA COMPRESSION METHOD INFORMATION | | |
| RIP CONTROL MODE | | |
| INPUT/ OUTPUT IMAGE INFORMATION SECTION | INFORMATION RELATED TO OUTPUT IMAGE | IMAGE FORMAT TYPE |
| | | IMAGE FORMAT DIMENSION |
| | | IMAGE FORMAT RESOLUTION |
| | | IMAGE POSITION |
| | | COLOR SEPARATION INFORMATION |
| | | COLOR PLANE FIT POLICY INFORMATION |
| | | PLANE SHIFT INFORMATION |
| | | IMAGE FORMAT COLOR BIT NUMBER |
| | | IMAGE DIRECTION INFORMATION |
| | | IMAGING POSITIONAL INFORMATION |
| | | IMAGING SIZE INFORMATION |
| | | IMAGING METHOD INFORMATION |
| | | COLOR ICC INFORMATION |
| | | FONT SUBSTITUTION INFORMATION |
| | | IMAGING BASE POINT INFORMATION |
| | | FLAT K BLACK INFORMATION |
| | | RENDERING INFORMATION |
| | INFORMATION RELATED TO INPUT IMAGE | IMAGE FORMAT TYPE |
| | | IMAGE FORMAT DIMENSION |
| | | IMAGE FORMAT RESOLUTION |
| | | IMAGE POSITION |
| | | INPUT DATA |
| | | PAGE RANGE INFORMATION |
| | | COLOR ICC INFORMATION |
| | INFORMATION RELATED TO HANDLING OF IMAGE | SCALING OFFSET INFORMATION |
| | | OBJECT AREA INFORMATION |
| | | HALFTONE INFORMATION |
| | | SCALING ALGORITHM INFORMATION |
| INFORMATION RELATED TO PDL | DATA AREA | |
| | SIZE INFORMATION | |
| | DATA LAYOUT METHOD | |

FIG.11

| SPECIFIC COMMAND | COMMON PDL | PDL-INSIDE SPECIFIC ATTRIBUTE |
|---|---|---|
| %% A_CropMark: Center | – | CENTER CROP MARK: ON |
| 2 B_imposition | – | IMPOSITION: 2-UP |

FIG.13

RIP Parameter List DATA FORMAT

| ITEMS | | |
|---|---|---|
| INPUT/OUTPUT DATA TYPE INFORMATION | | |
| INPUT/OUTPUT DATA READ/WRITE POSITION DESIGNATION METHOD INFORMATION | | |
| INPUT/OUTPUT DATA READ/WRITE POSITIONAL INFORMATION | | |
| INPUT/OUTPUT DATA READ/WRITE EXECUTION MODE INFORMATION | | |
| UNIT INFORMATION (DIMENSION) | | |
| INPUT/OUTPUT DATA COMPRESSION METHOD INFORMATION | | |
| RIP CONTROL MODE | | |
| INPUT/ OUTPUT IMAGE INFORMATION SECTION | INFORMATION RELATED TO OUTPUT IMAGE | IMAGE FORMAT TYPE |
| | | IMAGE FORMAT DIMENSION |
| | | IMAGE FORMAT RESOLUTION |
| | | IMAGE POSITION |
| | | COLOR SEPARATION INFORMATION |
| | | COLOR PLANE FIT POLICY INFORMATION |
| | | PLANE SHIFT INFORMATION |
| | | IMAGE FORMAT COLOR BIT NUMBER |
| | | IMAGE DIRECTION INFORMATION |
| | | IMAGING POSITIONAL INFORMATION |
| | | IMAGING SIZE INFORMATION |
| | | IMAGING METHOD INFORMATION |
| | | COLOR ICC INFORMATION |
| | | FONT SUBSTITUTION INFORMATION |
| | | IMAGING BASE POINT INFORMATION |
| | | FLAT K BLACK INFORMATION |
| | | RENDERING INFORMATION |
| | | CENTER CROP MARK: ON |
| | INFORMATION RELATED TO INPUT IMAGE | IMAGE FORMAT TYPE |
| | | IMAGE FORMAT DIMENSION |
| | | IMAGE FORMAT RESOLUTION |
| | | IMAGE POSITION |
| | | INPUT DATA |
| | | PAGE RANGE INFORMATION |
| | | COLOR ICC INFORMATION |
| | INFORMATION RELATED TO HANDLING OF IMAGE | SCALING OFFSET INFORMATION |
| | | OBJECT AREA INFORMATION |
| | | HALFTONE INFORMATION |
| | | SCALING ALGORITHM INFORMATION |
| INFORMATION RELATED TO PDL | DATA AREA | |
| | SIZE INFORMATION | |
| | DATA LAYOUT METHOD | |

INFORMATION PROCESSING APPARATUS, INFORMATION PROCESSING METHOD, AND RECORDING MEDIUM FOR CONVERSION OF VENDOR-SPECIFIC PRINT DATA

CROSS-REFERENCE TO RELATED APPLICATIONS

The present application is based on and claims the benefit of priority under 35 U.S.C §119 of Japanese Patent Application Nos. 2014-028527 filed Feb. 18, 2014 and 2015-024278 filed Feb. 10, 2015, the entire contents of which are hereby incorporated herein by reference.

BACKGROUND OF THE INVENTION

1. Field of the Invention

The present invention generally relates to an information processing apparatus and the like capable of acquiring a print job including print data and setting information and generating drawing data.

2. Description of the Related Art

There has been known a so-called "production printing" of printing a large quantity of documents and binding such documents into a books for professional use (see, for example, Japanese Patent Laid-open Publication No. 2012-238188). Japanese Laid-open Patent Publication No. 2012-238188 discloses a printing system capable of notifying a user of whether the post processing can be used based on a status of a printing system as a whole.

SUMMARY OF THE INVENTION

According to an aspect of the present invention, an information processing apparatus for generating drawing data by using a print job including print data and setting information, includes a description detection unit detecting a characteristic description included in the print data; a conversion unit converting the print data, the characteristic description, and the setting information into an instruction group; and one or more drawing data generation units generating the drawing data by executing the instruction group.

BRIEF DESCRIPTION OF THE DRAWINGS

Other objects, features, and advantages of the present invention will become more apparent from the following description when read in conjunction with the accompanying drawings, in which:

FIGS. 1A through 1C are drawings illustrating an example of an inconvenience where a print job is acquired;

FIGS. 2A and 2B are drawings illustrating an example of printing the print job based on a Digital Front End (DFE) according to an embodiment;

FIG. 3 is a drawing illustrating an example overall configuration of a print system;

FIGS. 6A through 6C are drawings illustrating examples of parts of descriptions of Job Definition Format (JDF);

FIGS. 7A through 7C are drawings illustrating examples of conversion tables;

FIG. 9 is a drawing illustrating an example of the "DFE-inside job attribute";

FIG. 10 is a drawing illustrating an example of "RIP Parameter List";

FIG. 11 is a drawing illustrating an example of own command conversion table;

FIG. 13 is a drawing illustrating an example of the "RIP Parameter List" after revision;

DETAILED DESCRIPTION OF THE PREFERRED EMBODIMENTS

Figure 2B:
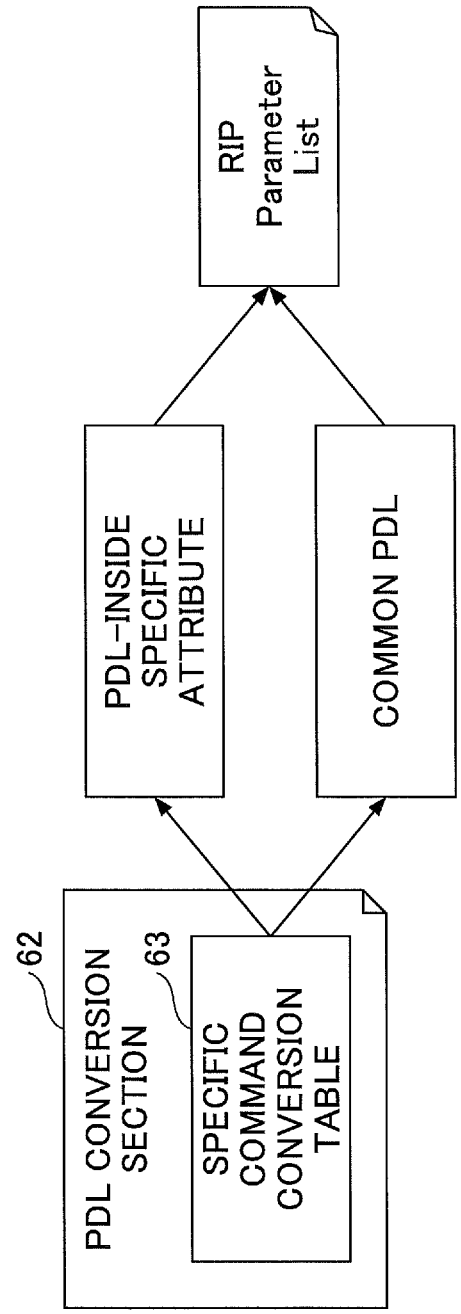

In related-art production printing, a print process is usually treated as a workflow. Further, a print workflow is more and more open. As a result, it becomes possible for venders who provide software solutions (workflow applications described below) or print apparatuses to describe settings in print jobs in main steps of printing using a common description method. As a format of describing an overall print workflow process, a standard format called "Job Definition Format (JDF)" is known.

The overall print workflow process includes various processes of generating a document or content, designating a print method, printing, post processing, etc. Basically, those processes are performed by various workflow applications or a print apparatus. However, by using the JDF, it becomes possible for print apparatuses to work together and to manage the print process.

However, there may be a case where the workflow applications or the print apparatus extends the JDF. In this case, the JDF generated by the workflow applications of the vendors may include a description specific to the workflow applications.

FIG. 1A illustrates an example of an inconvenience in a case where a print processing apparatus of vendor "C" receives print jobs. Here, note that FIG. 1 illustrates a comparative example and is not illustrated as prior art. In FIG. 1A, the print processing apparatus of vendor "C" receives the print jobs from workflow applications of vendors "A", "B", and "D". Here, the workflow applications have extended the respective JDFs. Therefore, there may be case where the print processing apparatus of vendor "C" cannot analyze and perform processing on the JDFs.

In order to correspond to the print jobs of the workflow applications, it is thought that the print processing apparatus of vendor "C" includes rendering engines which correspond to the JDF conversions and workflow applications (hereinafter "RIP engines").

In FIG. 1B, a JDF analysis section analyzes the JDFs, determines the respective vendors (suppliers) of the workflow applications who generated the JDFs, and converts the JDFs into setting information the print processing apparatus of vendor "C" can handle. Further, by having the RIP engines corresponding to the workflow applications, it becomes possible to perform the print jobs (print), which are generated by the workflow applications, in accordance with the user's intentions.

Therefore, even when the workflow applications extend the respective JDFs, it becomes possible for the print processing apparatus of vendor "C" to print the print jobs, which are generated by the workflow applications of the vendors "A", "B", and "D", in workmanship in accordance with the user's intentions.

On the other hand, there may be a case where a user would like to use the print processing apparatus of vendor "C" to print the print jobs that are generated by the workflow applications of the vendors "A", "B", and "D" even though the workmanship of the print slightly differs from that in accordance with the user's intentions. For example, a user may have a request (desire) to print the print job generated by the workflow application of the vendor "A" by using the not only the RIP engine of the vendor "A" but also the RIP engine of the vendor "B" or "D". Further, in a case where the RIP engines support a general-purpose Page Description Language (PDL) such as PostScript and PDF, any of the RIP engines may print the print jobs.

However, there may be a case where it is not possible for the RIP engine of the vendor "B" or "D" to print the print job generated by the workflow application of the vendor "A". FIG. 1C illustrates an example of a problem in a case where the RIP engine of the vendor "B" or "D" prints the print job generated by the workflow application of the vendor "A". As illustrated in FIG. 1C, it is not possible for the RIP engines of the vendors "B" and "D" to print the print job generated by the workflow application of the vendor "A".

This may occur even when, for example, the JDF analysis section converts the JDFs into the setting information that can be handled by the print processing apparatus of vendor "C". This is because the PDL may include commands specific to the respective vendors. For example, in a case where the PDL is PostScript, the PDL is more likely to include commands that are specific to the respective vendors, so that neither the RIP engine of the vendor "B" nor the RIP engine of the vendor "D" can print the print job generated by the workflow application of the vendor "A" even when the RIP engines of the vendors "B" and "D" support the Postscript.

The present invention is made in light of the above problem, and may provide an information processing apparatus capable of outputting an appropriate print output upon receiving a print job.

In the following, embodiments of the present invention are described with reference to the accompanying drawings.

First Embodiment

Outline of Embodiment in Printing a Print Job

FIG. 2A illustrates an example where a Digital Front End (DFE) according to this embodiment prints a print job. The DFE in FIG. 2A corresponds to the print processing apparatus. As illustrated in FIG. 2A, a DFE 32 of a vendor "C" includes a JDF analysis section 56 that converts the JDFs generated by the vendors "A", "B", and "C" into setting information that can be handled by the DFE 32 of the vendor "C" ("DFE inside job attribute"). The DFE 32 of the vendor "C" further includes RIP engines of the respective vendors "A", "B", and "C". Herein, description of a RIP engine of the vendor "D" is omitted.

The RIP engines have aptitudes for rendering (performing a drawing process) the print jobs generated for the RIP engines. Therefore, the print job generated by the workflow application of the vendor "A" is assumed to be rendered by the RIP engine of the vendor "A". Similarly, the print job generated by the workflow application of the vendor "B" is assumed to be rendered by the RIP engine of the vendor "B", and the print job generated by the workflow application of the vendor "C" is assumed to be rendered by the RIP engine of the vendor "C". Herein, note that the workflow application and the RIP engine of the vendor "X" refer to the workflow application and the RIP engine that are not only directly generated by the vendor "X" but also generated by a vendor other than vendor "X" for the vendor "X".

Further, the DFE 32 includes a PDL conversion section 62. The PDL conversion section 62 detects vendor "A", "B", and "C" specific commands (an example of claimed "characteristic description") in the PDL, and sets the detected vendor "A", "B", and "C" specific commands as attribution values of "RIP Parameter List" (an example of "order group") which is handled by the DFE 32 of the vendor "C".

In the following, a case is described where the workflow application of the vendor "A" generates a print job and the print job is printed by not only the RIP engine of the vendor "A" but also the RIP engine of the vendor "B" or "C".

FIG. 2B schematically illustrates the setting of the "RIP Parameter List" by the specific commands. The PDL conversion section 62 includes a specific command conversion table 63. In the specific command conversion table 63, specific commands are registered. The PDL conversion section 62 converts the specific commands into respective "PDL-inside specific attributes" and a "common PDL".

Herein, the term "specific command" refers to a PDL command that can be processed by the RIP engine that is assumed by the workflow application that generates the PDL. The term "common PDL" refers to a PDL command which is common among the vendors of the RIP engines. Further, the term "PDL-inside specific attribute" refers to attribute information that is converted from the specific command and to be set in the "RIP Parameter List".

The "common PDL" (an example of the claimed "corresponding print data") is common among the vendors. Therefore, there has been a conventional item to be set in the "RIP Parameter List". The PDL-inside specific attribute has been converted into the attribution information. Therefore, the PDL-inside specific attribute is set as an item corresponding to the "RIP Parameter List". Namely, the PDL-inside specific attribute is a setting item in printing. Therefore, there exists a corresponding item in the "RIP Parameter List". For example, there is a case where a setting that is to be set in the JDF is described in the PDL as a specific command. In this case, the specific command is converted into the PDL-inside specific attribute. Therefore, the specific command is set as an item of the "RIP Parameter List" that is to be set when the specific command is written in the JDF.

By doing this, even when a PDL of a print job generated by workflow application of the vendor "A" includes a specific command, it is possible to acquire the "RIP Parameter List" that does not include the specific command and having an appropriate item where an item value is set. Therefore, it becomes possible for not only the RIP engine of the vendor "A" but also the RIP engines of the vendors "B" and "C" to print a print job that is generated by the workflow application of the vendor "A".

Example Configuration

FIG. 3 illustrates an example overall configuration of a print system 200 according this embodiment. The print system 200 according to this embodiment includes one or more end user environments 1 and a Print On Demand (POD) print system environment 2 which are connected to each other via a network 3.

The end user environment 1 includes a client personal computer (PC) 11. The client PC 11 includes a workflow application for POD print business purposes (hereinafter simplified as "application") 12, so that a print job can be generated based on a user's operation.

The application 12 can perform a collective print function to adhere plural logical page images on a sheet surface (Number-up printing function) and an image edit function to add a header, a footer, a page number, etc., to the sheet surface. Further, the application 12 can designate instructions to punch, staple, etc., for binding prints. Those instructions and setting are described in the JDF. The JDF may be referred to as a "job ticket", "operative instructions", "print instructions", etc.

The POD print system environment 2 includes a process management section 20, a digital print section 30, and a post press section 40, which are connected to each other via the network 3. The process management section 20 sends operational instructions to the digital print section 30 and the post press section 40 in the POD print system environment 2 and collectively manages the workflow of the POD print system environment 2.

The process management section 20 receives a print job (JDF and PDL) from the end user environment 1, and stores the print job. The JDF is an example of claimed "setting information". The PDL is an example of claimed "print data". Basically, the PDL refers to a language to construct drawing content of a page image (a rasterized image). However, the term "PDL" herein refers to data described in a PDL. As the "PDL", there are, a Portable Document Format (PDF), Postscript, PCL, RPDL, etc.

Further, the process management section 20 can construct step operations as a workflow based on the print job from the end user environment 1, perform scheduling on the operations of the digital print section 30 and the post press section 40, and operators' operations, and notify an operator when an error occurs when necessary in automatic operation. Generally, the process management section 20 includes one or more PC servers 21.

The process management section 20 transmits the print job to the digital print section 30 to perform printing. Further, printed sheets (paper) are transmitted to the post press section 40, so that the post press section 40 performs processes such binding based on an instruction from the process management section 20. Further, the print job may be directly transmitted from the digital print section 30 to the post press section 40.

The digital print section 30 includes various printers 31 (printing apparatus such as, for example, a production oriented printer, a high-speed color inkjet printer, and a color/monochrome MultiFunction peripheral (MFP)). The digital print section 30 further includes a DFE 32. The DFE 32 may also be called the "print processing apparatus", and controls printing by the printers 31. The DFE 32 may be separated from the printers 31, or may be integrated into the printers 31. Upon receiving the print job from the process management section 20, the DFE 32 generates raster data (an example of claimed "drawing data") based on the JDF and the PDL so that the printers 31 can form a toner image or an image with ink, and transmits the raster data to the printers 31.

As described above, the digital print section 30 includes various printers 31. The digital print section 30 may further include a printer 31 that is directly connected to a finisher (post-processing apparatus), which performs post processing (post fabrication work) such as creasing, saddle stick binding, case working, punching, etc., on the printed recorded sheets.

The post press section 40 includes post processing devices such as a creasing device, a saddle stitching machine, a case working machine, a cutting machine, a mail inserter, a page setter, etc., in accordance with an operational instruction of printed sheets (post press job) received from the process management section 20. Further, the post press section 40 performs a finishing process such as creasing, saddle stick binding, case working, cutting, inserting, page setting, etc., on the printed sheets which are output from the digital print section 30. To that end, the post press section 40 includes post processing apparatuses to perform post processing (post fabrication work) after digital printing such as a stapler 401 and a punching machine 402.

An end user in the end user environment 1 uses the application 12 via the client PC 11 to send an instruction for editing an image, printing, inserting texts, post processing, etc., and transmits the print job to the process management section 2 of the POD print system environment 2.

The PC server 21 of the process management section 20 sends a print instruction to the digital print section 30 based on the JDF, and sends an instruction for the post processing to the post press section 40.

Hardware Configuration

In this embodiment, the print job generated by the end user environment 1 is received by the process management section 20, and the process management section 20 transmits the print job to the DFE 32. The functions of the DFE 32 according to this embodiment may not be directly performed by the DFE 32 if a device on the network can perform functions. However, in this embodiment, it is assumed that the DFE 32 performs a process of converting the (PDL) specific command into the PDL-inside specific attributes and the common PDL.

Figure 4:
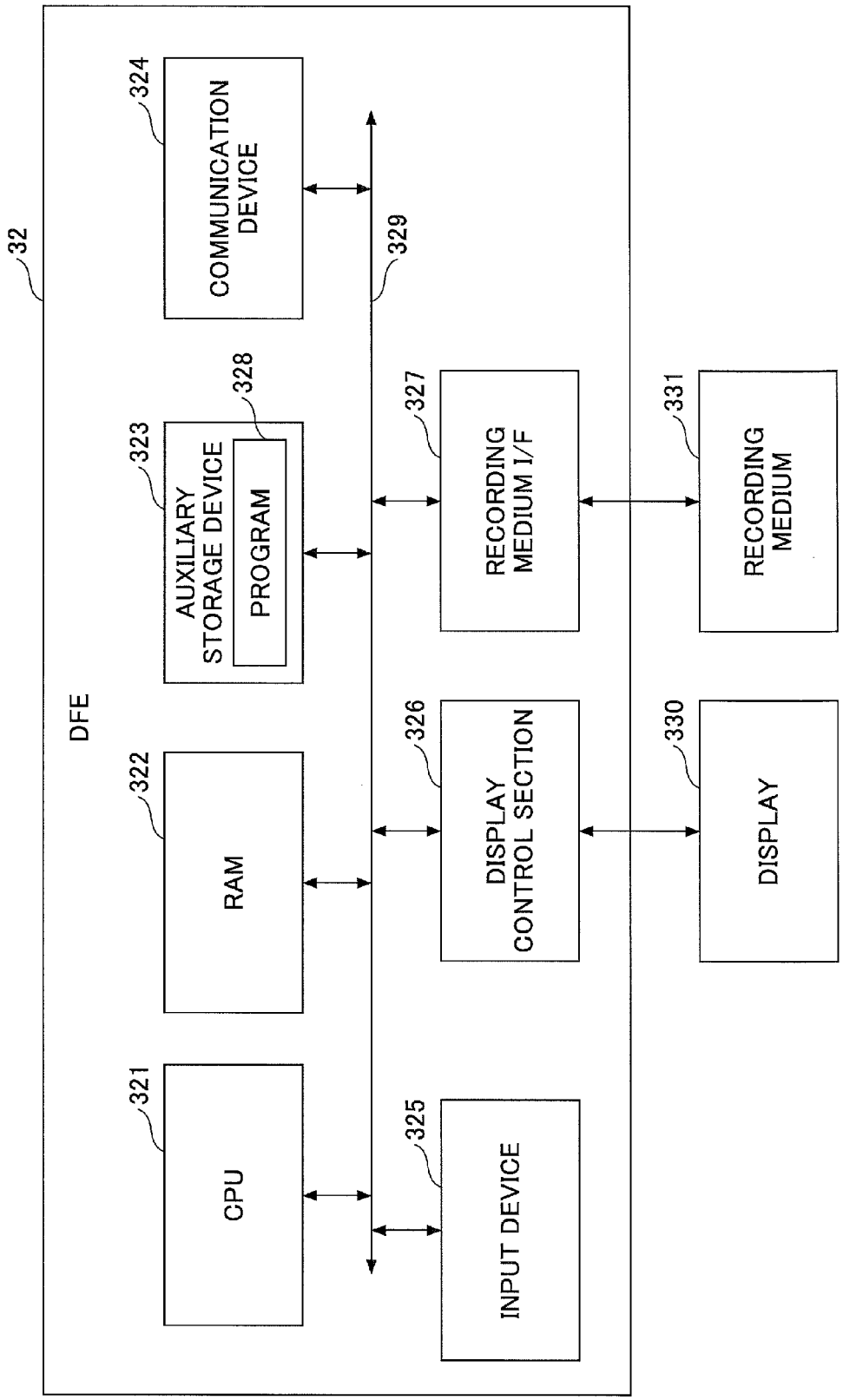
FIG. 4 is a drawing illustrating an example of a hardware configuration of the DFE.

FIG. 4 illustrates an example hardware configuration of the DFE 32. The DFE 32 can be realized by having, for example, the hardware configuration as illustrated in FIG. 4. Namely, the DFE 32 has the functions of an information processing apparatus (computer). The DFE 32 includes a Central Processing Unit (CPU) 321, a Random Access Memory (RAM) 322, an auxiliary storage device 323, a communication device 324, an input device 325, a display control section 326, and a recording medium interface (I/F) 327.

The CPU 321 controls the overall DFR 32 by executing a program 328 using the RAM 322 as a working memory. The auxiliary storage device 323 is a non-volatile memory such as a hard Disk Drive (HDD) or a Solid State Drive (SSD). The auxiliary storage device 323 stores a program 328 which has a function of converting a print job.

The communication device 324 is a modem, a Local Area Network (LAN) card or the like to be connected to the network 3 to communicate with the end user environment 1, the process management section 20 or the post press section 40, and the printers 31. The input device 325 is a keyboard, a mouse and the like to receive user's operations. The display control section 326 is connected to a display 330, and causes the display 330 to display a screen based on an instruction from the CPU 321. The display 330 may include a touch panel.

The recording medium I/F 327 is provided in a manner so that a removable recording medium 331 can be attached to and detached from the recording medium I/F 327. The recording medium I/F 327 reads data from a recording medium 331 and write data into the recording medium 331 based on the instructions from the CPU 321. As the recording medium 331, various types of the recording media may be used including, for example, a medium recording optically, electrically, or magnetically such as a Compact Disc Read-Only Memory (CD-ROM), an optical disk, a Universal Serial Bus (USB) memory, a SD card (registered trademark), etc., or a semiconductor memory electrically recording information such as a flash memory, etc.

Further, the program 328 is distributed via a recording medium with the program 328 stored therein or may be downloaded via the network 3 from a server (not shown).

Further, the client PC 11 of the end user environment 1 and the PC server 21 of the process management section 20 may also have a hardware configuration similar to that as described in FIG. 4.

Functions of the DFE 32

Figure 5:
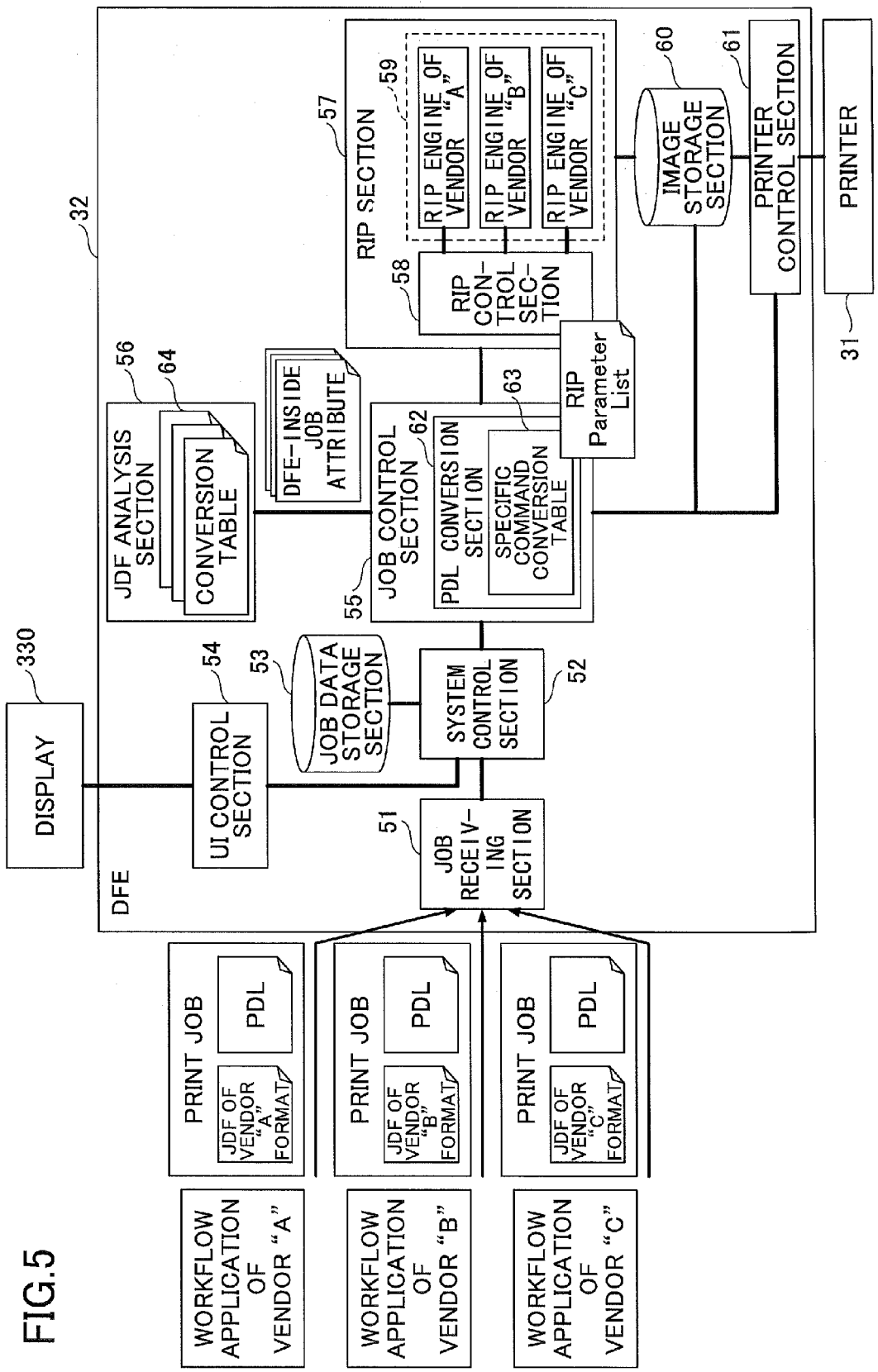
FIG. 5 is a drawing illustrating an example functional block diagram of the DFE.

FIG. 5 illustrates an example functional block diagram of the DFE 32. In a print workflow, the DFE 32 performs job control, Raster Image Processor (RIP) control, and printer control. Namely, the DFE 32 functions as a server that provides main print functions to the end user environment 1 and the process management section 20. Here, the job control refers to a series of control in a procedure of a print job including receipt of a print job, analysis of the JDF, generation of the raster data, printing by a printer 31, etc.

The RIP control herein refers to the control of generating the "RIP Parameter List" to cause the RIP engine 59 to generate the raster data after the generation of the "DFE inside job attribute". The "RIP" stands for "Raster Image Processor", and refers to a dedicated Integrated Circuit (IC) for generating the raster data or the generation of the raster data. The printer control is control of transmitting the raster data and a part of "DFE inside job attribute" ("Finishing information" described below) to the printer for printing.

The DFE 32 includes a job receiving section 51, a system control section 52, a user interface (UI) control section 54, a job control section 55, the JDF analysis section 56, a RIP section 57, a RIP control section 58, a RIP engine 59, and a printer control section 61. These elements can be realized when the CPU 321 executes the program 328 and various hardware elements of FIG. 4, etc., work together. The DFE 32 further includes a job data storage section 53 and an image storage section 60 that are formed of the auxiliary storage device 323, the RAM 322, the recording medium 331, etc.

The job receiving section 51 receives the print job from the application 12, etc., via the network 3. As the logs, a unique job number, received day and time, finished day and time, a status, etc., are stored in association with the print job. The print job is input from the application 12 but may be input via the USB memory, etc. In this embodiment, it is assumed that the JDF is included in the print job. However, when the JDF is not included in the print job, the job receiving section 51 may generate a dummy JDF to make it possible to perform rendering.

The system control section 52 stores the received print job into the job data storage section 53 or outputs the received print job to the job control section 55. For example, in a case where it is determined that a print job is to be stored in the job data storage section 53 of the DFE 32, the system control section 52 stores the received print job into the job data storage section 53. Further, in a case where, in the JDF, the information is described whether to be stored into the job data storage section 53, the system control section 52 follows the described information.

Further, when, for example, a user operates to display the content of the print job, which is stored in the job data storage section 53, on the display 330, the system control section 52 outputs the JDF from the job data storage section 53 to the UI control section 54. Further, when a user changes the JDF, the UI control section 54 receives the changed content and the system control section 52 stores again the changed (revised) print job into the job data storage section 53.

Further, upon receiving an instruction to perform the print job from a user, the end user environment 1, or the process management section 20, the system control section 52 outputs the print job stored in the job data storage section 53 to the job control section 55. Further, for example, in a case where print time is set in the JDF, the system control section 52 outputs the print job stored in the job data storage section 53 to the job control section 55 at the print time.

The job data storage section 53 is a storage area to store the print job as described above, and is formed in the auxiliary storage device 323 of the DFE 32 or in the recording medium 331. The job data storage section 53 may be formed (provided) in a storage device (not shown) on a network.

The UI control section 54 interprets the JDF and displays the content of the print job on the display 330. Further, the UI control section 54 can display the raster data, which are generated by the RIP engine 59, on the display 330.

The job control section 55 causes the RIP control section 58 to generate the raster data, and causes the printer control section 61 to perform printing. Specifically, first, the job control section 55 transmits the JDF of the print job to the JDF analysis section 56, and outputs a JDF conversion request to convert the JDF to the JDF analysis section 56.

The JDF analysis section 56 acquires the JDF and the JDF conversion request from the job control section 55. The JDF analysis section 56 interprets the description of the JDF and determines the vendor (supplier) of the application 12 having generated the JDF. Here, the determination of the vendor of the application 12 having generated the JDF is substantially equivalent to the determination of the rendering engine by which it is assumed that the print job is rendered.

The JDF analysis section 56 converts the JDF into the "DFE inside job attribute" that can be handled by the DFE 32 based on a method using a conversion table 64 provided by a vendor of the application 12 basis. The "DFE inside job attribute" is an example of the claimed "apparatus setting information". Namely, regarding the DFE 32 generated by the vendor "C", the JDF analysis section 56 converts not only the JDF generated by the application of the vendor "C" but also the JDF generated by the application of the vendor "B" or "C" into the "DFE inside job attribute" that is handled by the DFE 32 of the vendor "C".

Further, when generating the "DFE inside job attribute", the JDF analysis section 56 sets the "RIP control mode" to the "DFE inside job attribute". Details of the "RIP control mode" are described below. The "RIP control mode" includes a "Page Mode" and a "Sheet Mode". Here, it is assumed that which of the "Page Mode" and a "Sheet Mode" corresponds to the print job is known in advance. Therefore, when the vendor of the application 12 that generated the JDF is determined, it is also possible to determine the "RIP control mode". In this embodiment, it is assumed that the DFE 32 recognizes that the setting of the collective printing of the print job is "page Mode" (i.e., the default is "Page Mode").

The job control section 55 that acquires the "DFE inside job attribute" as described above converts the "DFE inside job attribute" and the PDL into the "RIP Parameter List", and outputs the print job in the form of the "RIP Parameter List" to the RIP control section 58. The "RIP Parameter List" is a set of information that is necessary to perform a RIP process in the RIP engine 59. The job control section 55 determines an instruction of the RIP process to the RIP engine 59 based on the information of the "RIP Parameter List". This command is called a "RIP command".

In this embodiment, a specific command is extracted from the PDL, and the specific command is reflected in the "RIP Parameter List". The generation of the "RIP Parameter List" is described below.

The "RIP Parameter List" also includes the "RIP control mode". The RIP control section 58 controls the RIP engine 59 in accordance with the "RIP control mode". Accordingly, the sequence is determined based on the "RIP mode".

The "Page Mode" refers to a mode in which the RIP process is operated (instructed) on a page basis and raster data collected into one page is generated. The "Sheet Mode" refers to a mode in which the RIP process is performed on each part (corresponding to one page before having been collected) in one page where plural pages are already collected and the raster data are generated.

The RIP section 57 includes the RIP control section 58 and the RIP engine 59, and generates the raster data by using the RIP control section 58 and the RIP engine 59. The RIP control section 58 analyzes the information of the "RIP Parameter List", and determines the RIP engine 59 to be used from among plural RIP engines 59. The determination of the RIP engine 59 may be based on one or more items of the "RIP Parameter List" or may be based on the RIP engine identification information explicitly described in the "RIP Parameter List". For example, the RIP engine 59 is determined based on the description "xmlns:A="www.aaa.com/schema/aaa" or "xmlns:B="www.bbb.com/schema/bbb" in the "RIP Parameter List". Further, when the job control section 55 explicitly describes the RIP engine identification information in the "RIP Parameter List", the RIP control section 58 selects the RIP engine that is indicated in the RIP engine identification information. The RIP control section 58 refers to the "RIP Parameter List", and transmits the RIP command to the selected RIP engine 59.

Further, the RIP control section 58 refers to the "RIP Parameter List". When the "RIP control mode" is the "Sheet Mode", the RIP control section 58 outputs the RIP command, in accordance with the "Sheet Mode", to the RIP engine 59. By doing this, the difference in print jobs can be overcome (compensated for).

The RIP engine 59 is a rendering engine to generate raster data by performing rasterization based on the RIP commands.

The image storage section 60 is a storage means to store the generated raster data. The image storage section 60 is mounted in, for example, the auxiliary storage device 323. The image storage section 60 may be mounted in a storage device on a network.

The printer control section 61 is connected to the printers 31, so that printing is performed by reading the raster data stored in the image storage section 60 and transmitting the raster data to the printers 31. Further, the printer control section 61 performs the finishing process based on the "Finishing information" acquired from the job control section 55.

Determination of JDF and Vendor of the Application Having Generated JDF

The JDF is described in Extensible Markup Language (XML). The XML is a standard of a structured text to structure a document by adding meanings to tags.

FIGS. 6A through 6C illustrate examples of parts of JDF descriptions. It is assumed that the JDF in FIG. 6A is generated by the application 12 of the vendor "C". In JDF, a content of the instruction to print job is described.

The description "JDF xmlns="http://eee.CIP4.org/JDF-SChema_1_1"" denotes the CIF4-compliance JDF ticket.

The description "xmlns:C="www.ccc.com/scheme/ccc"" denotes a definition of an extended JDF tag in which a print supplier/vendor who is not CIF4-compliant has uniquely extended. In this example, all the tags which start from "C:" in the JDF are the extended tags.

The description "ResourcePool" defines a set of attributes to realize printing.

The description "LayoutPrepareationParama" is one of the attribute defined in the "ResourcePool", and defines attributes related to printing.

The description "ResourceLinkPool" defines a set of references to the attributes commonly used in the "ResourcePool" corresponding to a specific range when attributes differ in the specific range such as between pages in a job.

The description "ComponentLink" is one definition of references in the "ResourceLinkPool", and designates the reference of attributes related to outputs and the information of the outputs.

The description "Amount" designates the number of prints.

The description "Rotate" designates the rotation angle of an image.

FIG. 6B illustrates an example of the JDF of vendor "A" and extended definition. FIG. 6C illustrates an example of the JDF of vendor "B" and extended definition. As the description "xmlns:A="www.aaa.co,/schema/aaa"" in FIG. 6B, all the tags which start from "A:" are extended tags of the vendor "A". Similarly, as the description "xmlns:B="www.bbb.co,/schema/bbb"" in FIG. 6C, all the tags which start from "B:" are extended tags of the vendor "B". The description of the JDF of the vendor "D" is herein omitted.

Therefore, by referring to those descriptions in the JDF, the JDF analysis section 56 can identify the vendor of the application 12 that generated the JDF. In accordance with the vendors of the applications 12, by using the conversion table 64, the JDF can be converted into the "DFE inside job attribute" that can be handled by the DFE 32 of the vendor "C".

Generation of the DFE Inside Job Attribute

Figure 8A:
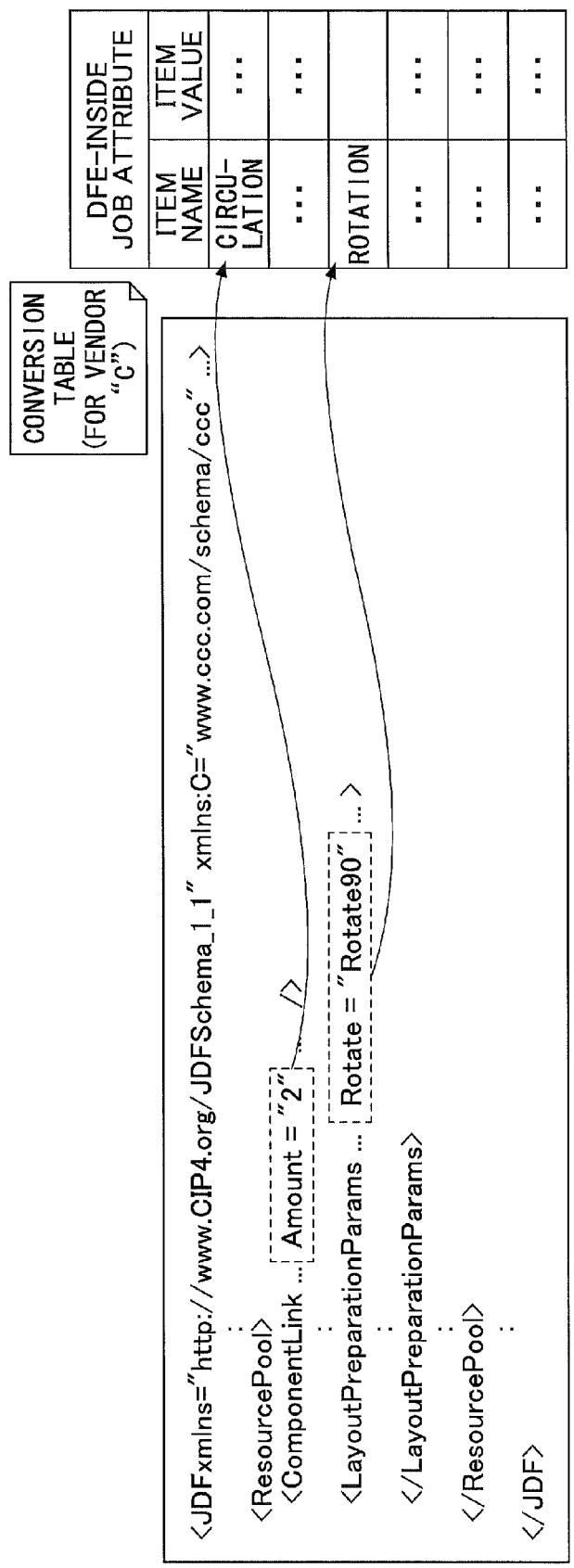
FIGS. 8A through 8C are drawings illustrating generation of "DFE-inside job attribute"
Figure 8B:
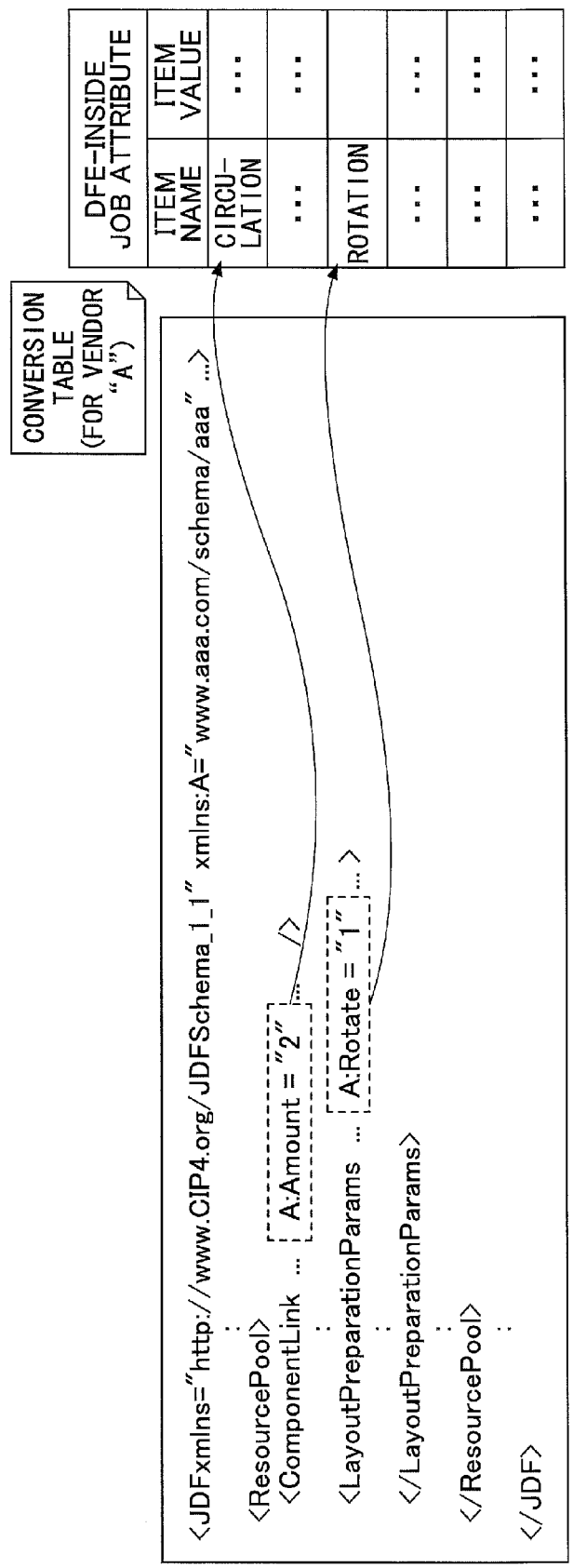
Figure 8C:
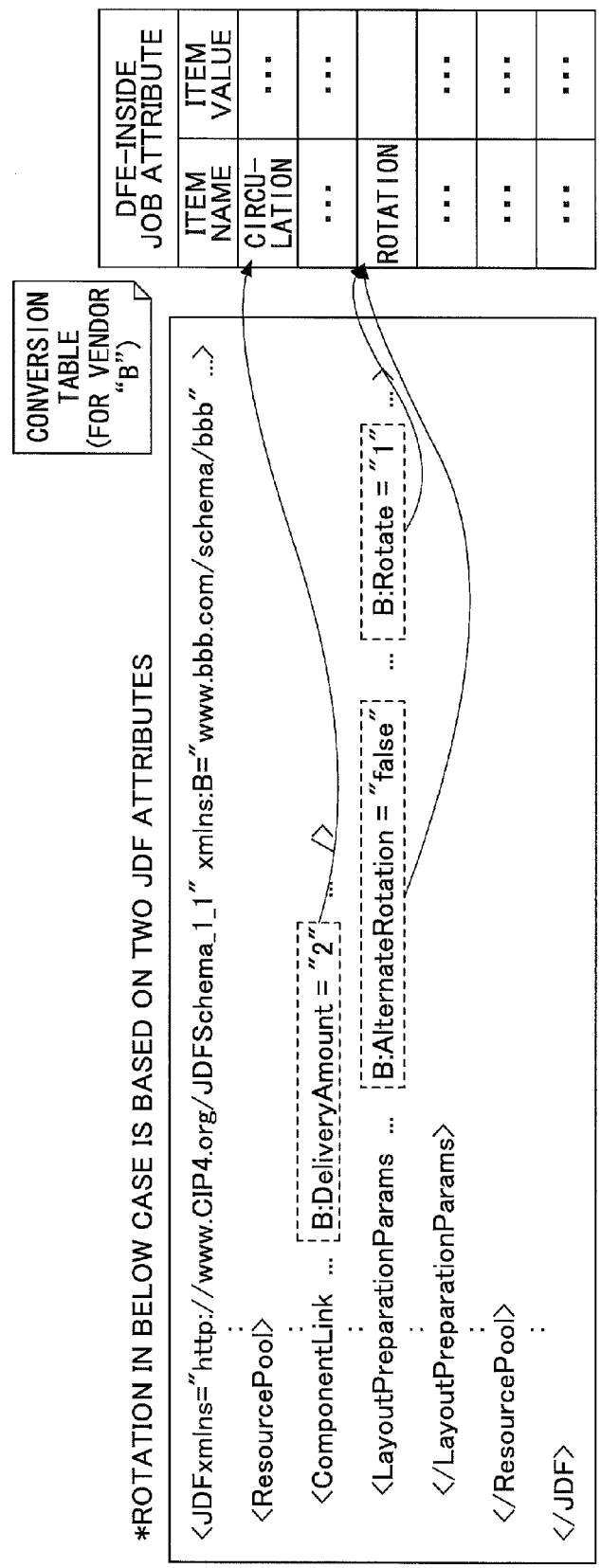

The generation of the "DFE inside job attribute" is described with reference to FIGS. 7A through 8C. Here, the DFE 32 is generated or is thought to be generated by the vendor "C", where the vendor "C" corresponds to the "own company" for the DFE 32. FIGS. 7A through 7C illustrate an examples of the conversion table 64. FIGS. 8A through 8C illustrate an example of the generation of the "DFE inside job attribute". The JDF analysis section 56 converts the JDF into the "DFE inside job attribute" by using the conversion table 64 of the vendor (the RIP engine that is assumed to process the print job) of the application 12 that generated the JDF. When it is not possible to determine the vendor of the application 12 that generated the JDF, the JDF is converted into the "DFE inside job attribute" by using all the conversion tables. In this case, the "DFE inside job attributes" corresponding to all the RIP engines are generated.

FIG. 7A illustrates an example conversion table for the vendor "C". In the conversion table 64 for the vendor "C", the attribute value of the attribution name called "Amount" corresponds to the item value of the item name called "circulation", and the attribute value of the attribution name called "Rotate" corresponds to the item value of the item name called "Rotation".

As the conversion method, as illustrated in FIGS. 8A through 8C, the conversion table 64 in which the attribute in tag of the JDF corresponds to the item of the "DFE inside job attribute" is referred to, and the corresponding attribute value of the JDF is allocated as the item value of the "DFE inside job attribute".

The JDF analysis section 56 stores in advance not only the conversion table for the vendor "C" but also the conversion tables for the vendors "A" and "B". FIGS. 7B and 7C illustrate the conversion tables 64 for the vendors "B" and "C", respectively. The JDF analysis section 56 detects the description designating the extended tag from the JDF as describe above, determines the vendor of the application, and uses the conversion table 64 corresponding to the vendors.

In the cases of the JDFs of the vendors "A" and "B", the conversion can be performed in the same manner. In the conversion table 64 for the vendor "A", the attribute value of the attribution name called "A:Amount" corresponds to the item value of the item name called "circulation", and the attribute value of the attribution name called "A:Rotate" corresponds to the item value of the item name called "Rotation". In the conversion table 64 for the vendor "B", the attribute value of the attribution name called "B:DeliveryAmount" corresponds to the item value of the item name called "circulation", and the attribute value of the attribution name called "B:Rotate" corresponds to the item value of the item name called "Rotation". Further, in the conversion table 64 for the vendor "B", only when the attribute value of the attribute name called "B:AlternateRotation" is "false", the rotation becomes effective. Therefore, when it is determined that the JDF of the vendor "A" or "B", the "DFE inside job attribute" can be generated similar to the case of the JDF for the vendor "C".

When it is determined that the format of the print job in the collective printing is generated by the application 12 of the vendor other than the own vendor (vendor "C"), the JDF analysis section 56 sets the "Sheet Mode" to the item of the "RIP control mode" of the "DFE inside job attribute". On the other hand, when it is determined that the application 12 is generated by the own vendor (vendor "C") or the format of the print job in the collective printing is generated by the application 12 of the same vendor (vendor "C"), the JDF analysis section 56 sets the "Page Mode" to the item of the "RIP control mode" of the "DFE inside job attribute". By doing this, the RIP control section 58 can control the RIP command to be output to the RIP engine 59 in accordance with the "RIP control mode".

FIG. 9 illustrates an example of the "DFE inside job attribute". The "DFE inside job attribute" is mainly divided into "job information" which is related to job execution, "Edit information" which is related to the raster data, and "Finishing information" which is related to the finishing process.

The Job information includes an item "circulation" which designates the circulation.

An item "direction information" in the "Edit information" designates a printing direction.

An item "print surface information" in the "Edit information" designates a print surface.

An item "rotation" in the "Edit information" designates a rotation angle of a page.

An item "enlarge/reduce" in the "Edit information" designates enlarge or reduce and a magnification ratio.

An item "image position: offset" in the "Edit information" designates an offset of an image.

An item "image position: positional adjustment information" in the "Edit information" designates a positional adjustment of an image.

An item "layout information: custom imposition layout" in the "Edit information" designates the layout of a custom surface.

An item "layout information: No. of pages" in the "Edit information" designates the number of pages for sheets of paper.

An item "layout information: imposition information" in the "Edit information" designates the information related to a surface arrangement.

An item "layout information: page order information" in the "Edit information" designates the information related to an order of pages to be printed.

An item "layout information: creep position adjustment" in the "Edit information" designates the information related to an adjustment of a creep position.

An item "margin information" in the "Edit information" designates the information related to a margin for a fit box and a gutter.

An item "crop mark information: center crop mark information" in the "Edit information" designates the information related to a center crop mark information.

An item "crop mark information: corner crop mark information" in the "Edit information" designates the information related to a corner crop mark information.

An item "Collate information" in the "Finishing information" designates the information indicating whether to print on a page basis or on a document basis when multiple copies of a document are printed.

An item "stapling/binding information" in the "Finishing information" designates the information related to stapling/binding.

An item "punching information" in the "Finishing information" designates the information related to punching.

An item "creasing information" in the "Finishing information" designates the information related to creasing.

An item "trimming" in the "Finishing information" designates the information relate to trimming.

An item "output tray information" in the "Finishing information" designates the information related to an output tray information.

An item "input tray" in the "Finishing information" designates the information related to an input tray.

An item "cover sheet information" in the "Finishing information" designates the information related to a cover sheet.

Further, as illustrated in FIG. 9, in the "DFE inside job attribute", the "RIP control mode" is set. As the "RIP control mode", the "Page Mode" or the "Sheet Mode" is set. In a case of a dummy JDF, it is assumed that the "Page Mode" is set as the "RIP control mode".

Example of RIP Parameter List

FIG. 10 illustrates an example of the "RIP Parameter List".

An item "input/output data type information" designates a type of input/output data (the input/output data are designated in not only PDL but also a text file, an image data such as in JPEG, etc.).

An item "input/output data read/write position designation method information" designates a designation method of designating an offset of input/output data (read/write position). For example, it is possible to designate as "from designated position", "from the current position", "form the end", etc.

An item "input/output data read/write positional information" designates the current processing position of the input/output data.

An item "input/output data read/write execution mode information" is the information which designates an execution mode. For example, "READ", "WRITE", "READ_WRITE", etc., is set.

An item "unit information (dimension)" designates the unit used in the "RIP Parameter List". For example, a unit such as "mm", "inch", "pel", "point", etc. is designated.

An item "input/output data compression method information" designates a compression method of input/output data. For example, "UNCOMPRESSED", "PACKBITS", etc., is designated.

An item "RIP control mode" designates a control mode in collective printing. For example, the "Page Mode" or the "Sheet Mode" is designated.

An item "input/output image information section" includes items "information related to output image", "information related to input image", and "information related to handling of an image".

An item "image format type" designates a format type of an output image. For example, a type "raster" is designated.

An item "image format dimension" designates the dimensions of an output image format.

An item "image format resolution" designates the resolution of an output image format.

An item "image position" designates the position of an output image.

An item "color separation information" designates color separation (color decomposition). For example, "k", "cmyk", "separation", etc., is designated.

An item "color plane fit policy information" designates a development method of a color plane.

An item "plane shift information" designates a shift amount of a color plane.

An item "image format color bit number" designates the color bit number of an output image format.

An item "image direction information" designates a direction of a page of an output image.

An item "imaging (image formation) positional information" designates a positional information of a crop area.

An item "imaging size information" designates size information of the crop area.

An item "imaging method information" designates a clipping policy.

An item "color ICC information" designates the information related to a color ICC profile.

An item "font substitution information" designates the information related to substitution of a font.

An item "imaging base point information" designates an imaging original point. For example, "center", "right-upper", etc., is designated.

An item "flat K black information" designates the information related to flat K black.

An item "rendering information" designates the information related to rendering (rasterizing).

An item "image format type" designates a format type of an input image. For example, "raster", etc., is designated.

An item "image format dimension" designates the dimension of a input image format.

An item "image format resolution" designates the resolution of the input image format.

An item "image position" designates the position of an input image.

An item "input data" designates the input data.

An item "page range information" designates a page number.

An item "color ICC information" designates the information related to color ICC profile.

An item "scaling offset information" designates an offset of an enlarging/reducing algorithm. For example, "horizontal direction offset", "vertical direction offset", etc., is designated.

An item "object area information" designates the width and the height of an object area.

An item "halftone information" designates an offset of a half tone. For example, "horizontal direction offset", "vertical direction offset", etc., is designated.

An item "scaling algorithm information" designates a scaling method.

An item "information related to the PDL" designates a data area, size information, and data layout method.

An item "data area" designates the area information stored in the PDL. Font information, information of the number of pages, etc., are included in the PDL that exists in the data area.

An item "size information" designates the size of the PDL.

An item "data layout method" designates the layout method of data. For example, "little endian", "big endian", etc., is designated.

Detection of Specific Command and Update of RIP Parameter List

FIG. 11 illustrates an example of the specific command conversion table 63. The specific command conversion table 63 is an example of claimed "description conversion table". In the specific command conversion table 63, the "specific command" is associated with the "common PDL" and the "DFE inside job attribute". Further, the specific commands differ depending on the applications. Therefore, the specific command conversion table 63 is generated on an application basis (i.e., for each of the RIP engines).

The generation of the specific command conversion table 63 is described. The specific command is detected as a PDL command (description) in which an error occurs when the PDL and the "DFE inside job attribute" is rendered by the RIP engine 59 that is not assumed to perform rendering. Further, for example, the specific command may be detected by a person of the vendor "C" to determine which types of specific commands are included in the applications 12.

It is possible to estimate what kind of a common PDL and a PDL inside specific attribute does the detected specific command mean by rendering the PDL and the "DFE inside job attribute" using the RIP engine that is assumed to perform rendering.

The "common PDL" refers to a command which is common among the RIP engines of the vendors. On the other hand, the "PDL inside specific attribute" may be referred to a print setting that is not included in a general print setting. Such setting may be already included in the JDF, and may be treated as a specific (optional) print setting in applications 12. However, in any case, when the specific command operates in the raster data, etc., it becomes possible to convert the specific command into the "DFE inside job attribute". Further, it is also possible determine that it is not necessary to convert a specific command into the "DFE inside job attribute" when the specific command corresponds to the attribute information that is not supported by the RIP engines of the other vendors (that does not influence the raster data).

The specific command conversion table 63 is generated by associating the detected command with at least one of (or both) the common PDL and the PDL inside specific attribute which are searched as described above.

In FIG. 11, the specific command "%% A_CropMark: Center" is associated with the common PDL "-" and the PDL inside specific attribute "center crop mark: ON". The symbol "-" herein denotes that there is no corresponding general PDL command available. This specific command is deleted from the input PDL. On the other hand, the "center crop mark: ON" denotes a center mark printing, which is, basically, a print setting set by the JDF. This print setting includes an attribute and an attribute value. Herein, both the attribute and the attribute value are called "attribute information". The attribute information that is set in the JDF can be set in an item corresponding to the "RIP Parameter List". Further, needless to say, the specific command includes the attribute and the attribute value.

Therefore, by converting a specific command into the common PDL and the PDL inside specific attribute, it becomes possible to delete the specific command and extract the common PDL or the PDL inside specific attribute to perform rendering.

Further, in FIG. 11, the specific command "2B_imposition" is associated with the common PDL "-" and the PDL inside specific attribute "Imposition: 2-up". The symbol "-" is described above. On the other hand, the "Imposition: 2-up" denotes collective printing two pages, and which is, basically, a print setting set by the JDF.

Figure 12:
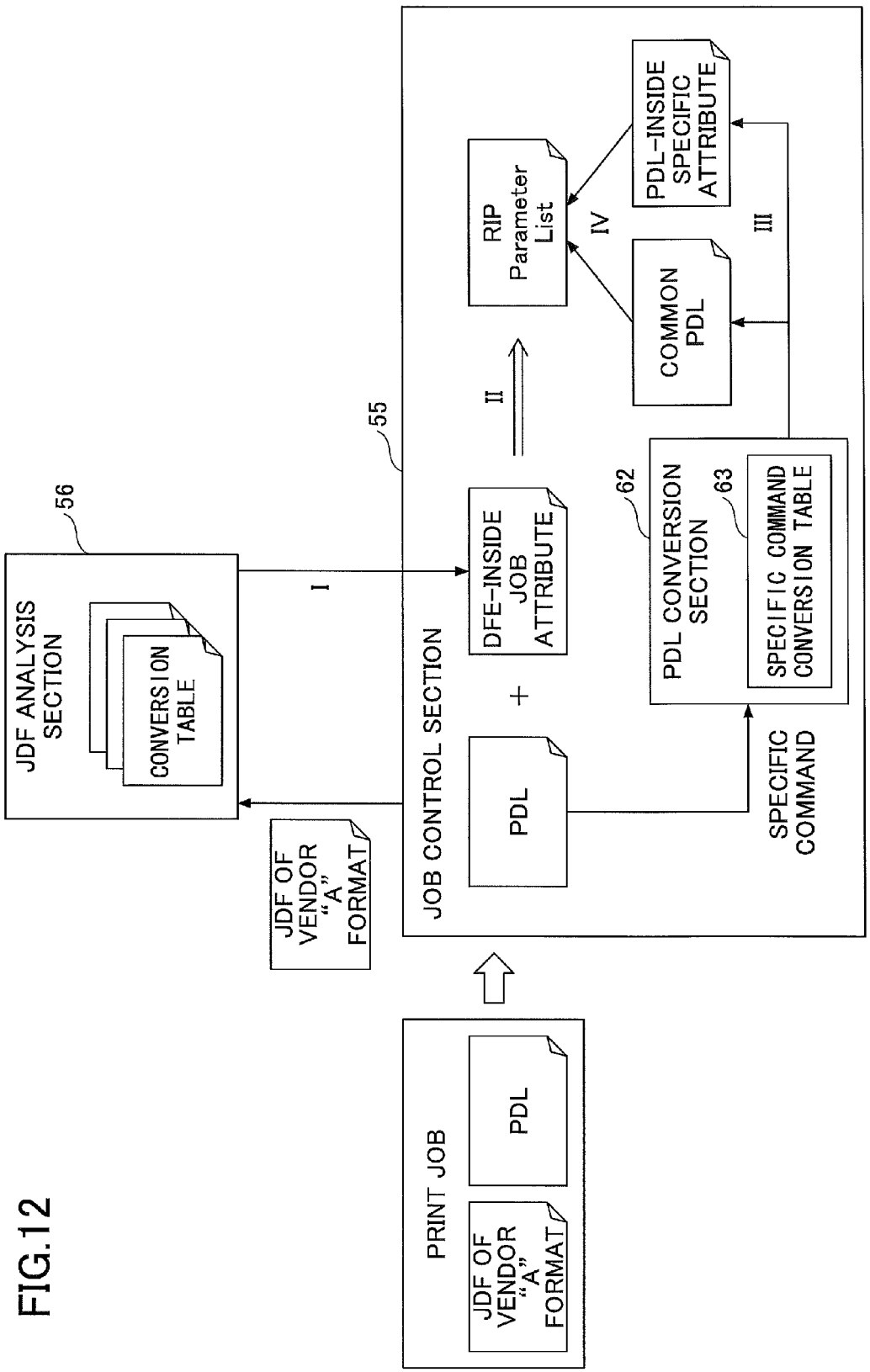
FIG. 12 is a drawing schematically illustrating a procedure of generating the "RIP Parameter List"

FIG. 12 schematically illustrates an example of generating the "RIP Parameter List" according to an embodiment.
I.: When the job control section 55 outputs a JDF in a vender "A" format to the JDF analysis section 56, the JDF analysis section 56 generates the "DFE inside job attribute".
II.: The job control section 55 generates the "RIP Parameter List" based on the PDL and "DFE inside job attribute". In this case, the "RIP Parameter List" may be generated according to a method similar to a related-art method.
III.: The PDL conversion section 62 detects a specific command from the PDL, and converts the specific command into the common PDL and the PDL-inside specific attribute. In this case, both the common PDL and the PDL-inside specific attribute are not always generated from the specific command. Namely, there may exist a case where the specific command is converted into only one of the common PDL and the PDL-inside specific attribute (or the specific command cannot be converted).
IV. The job control section 55 updates the "RIP Parameter List" by using the common PDL and the PDL-inside specific attribute. The common PDL is a common setting in the applications of all the vendors. Therefore, the common PDL is set in a predetermined item of the "RIP Parameter List". Further, the job control section 55 sets the PDL-inside specific attribute to be an item corresponding to the "RIP Parameter List". It is already known how the PDL-inside specific attribute behaves (operates) in the raster data, etc. Therefore, for example, a table in which the PDL-inside specific attribute is associated with the item of the "RIP Parameter List" is generated in advance. Due to the above, it becomes possible for the "RIP Parameter List" to provide an operation similar to that of the specific command.

In the method of FIG. 12, the "RIP Parameter List" is generated based on the PDL and the "DFE inside job attribute". Therefore, it become possible to control the change of the processing procedure of the job control section 55.

Figure 14:
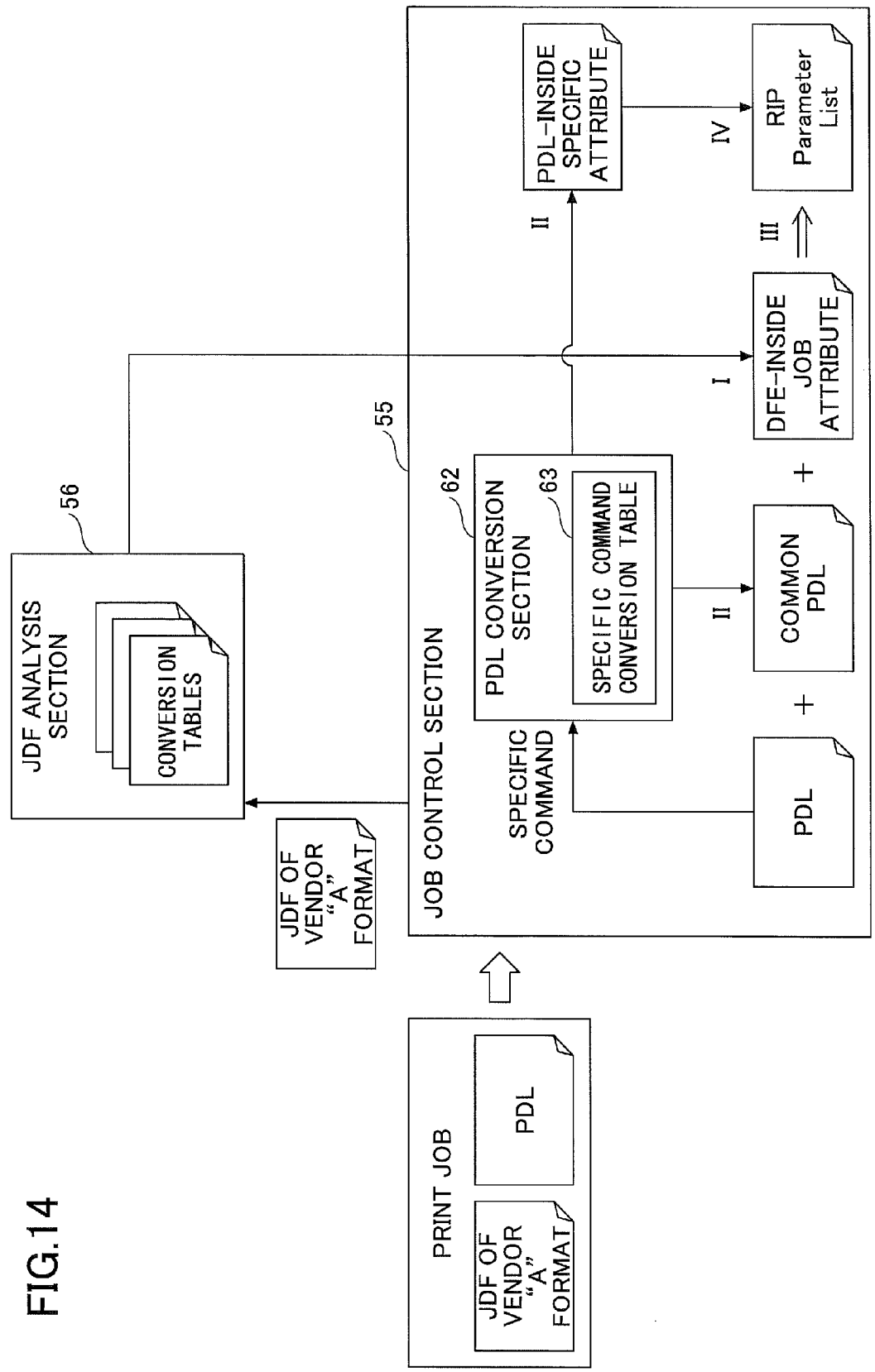
FIG. 14 is a drawing schematically illustrating another procedure of generating the "RIP Parameter List"

FIG. 13 illustrates an example "RIP Parameter List" after update. There is attribute information "center crop mark: ON" added to an item "information related to output image" of the "input/output image information section". Note that FIG. 3 is provided for explanation purposes only. As long as the information "center crop mark: ON" is included in the "RIP Parameter List", it is not necessary that the "center crop mark: ON" is added as the attribute information to the "RIP Parameter List", so that the "RIP Parameter List" is updated. Another example of the generation of the RIP Parameter List using the common PDL and the PDL-inside specific attribute FIG. 14 schematically illustrates another example of generating the "RIP Parameter List" according to an embodiment.
I.: When the job control section 55 outputs a JDF in a vender "A" format to the JDF analysis section 56, the JDF analysis section 56 generates the "DFE inside job attribute".
II.: The PDL conversion section 62 detects a specific command from the PDL, and converts the specific command into the common PDL and the PDL-inside specific attribute. In this case, both the common PDL and the PDL-inside specific attribute are not always generated from the specific command. Namely, there may exist a case where the specific command is converted into only one of the common PDL and the PDL-inside specific attribute.
III. The job control section 55 generates the "RIP Parameter List" by using the PDL, the common PDL, and the "DFE inside job attribute". In related art, the "RIP Parameter List" is generated based on the PDL and the "DFE inside job attribute", and it is possible to regard the common PDL as a part of the PDL. Therefore, it is possible to generate the "RIP Parameter List" based on the PDL, the common PDL, and the "DFE inside job attribute".
IV. The job control section 55 sets the PDL-inside specific attribute to be an item corresponding to the "RIP Parameter List". Due to the above, it becomes possible for the "RIP Parameter List" to provide an operation similar to that of the specific command.

In the method of FIG. 14, the common PDL is extracted first, and the "RIP Parameter List" is generated. Therefore, it becomes possible to reduce the change relative to the "RIP Parameter List".

Based on the processes described above, a setting of the print job included in the specific command can be extracted and set to an appropriate item of the "RIP Parameter List".

Selection of RIP Engine

The "RIP Parameter List" generated by the job control section 55 according to an embodiment can cause the RIP engine of the vendor "A", the RIP engine of the vendor "B", and RIP engine of the vendor "C" to perform rendering. This is because the conversion table 64 and the specific command conversion table 63 are provided for each of the RIP engines. Therefore, the RIP control section 58 can select any RIP engine 59. Further, the RIP control section 58 may select the RIP engine 59 based on, for example, the following method.
i) The RIP engine 59 that is set by a user is used (selected).

ii) The RIP engine 59 is used corresponding to the conversion table 64 with which the conversion from the JDF into the "DFE inside job attribute" is performed in a good manner.

In the method of the case "i)", the RIP engine, which is set by a user via the UI control section 54 or a network, is used. However, when there exists a setting to designate the RIP engine 59 in the JDF, the designated RIP engine 59 may be used.

Whether the conversion in the case "ii)" is performed "in a good manner" is determined by the JDF analysis section 56 by comparing between the items of the "DFE inside job attributes", which are converted from the JDF, and the attributes of the JDF. More specifically, the JDF analysis section 56 compares between the values of the attributes of the JDF and the corresponding values in the items of the "DFE inside job attributes" one by one. The smaller the difference before and after the conversion, the higher is the score value given by the JDF analysis section 56. By summing the score values, the score values of the RIP engines are acquired. The greater the score value, the better the conversion is. Therefore, JDF analysis section 56 selects the RIP engine 59 having the greatest score value.

When the method is used where the RIP engine 59 is selected based on the score values, it is more likely to occur when the RIP engine of the vendor "A" is selected for the print job that is generated by the application 12 of the vendor "A", the RIP engine of the vendor "B" is selected for the print job that is generated by the application 12 of the vendor "B", and the RIP engine of the vendor "C" is selected for the print job that is generated by the application 12 of the vendor "C". However, it is possible to automatically select an appropriate RIP engine 59 even when a print job, which is generated by an unknown application 12, is input or even when the vendor of the application 12 is wrongly determined.

Operation Procedure

Figure 15:
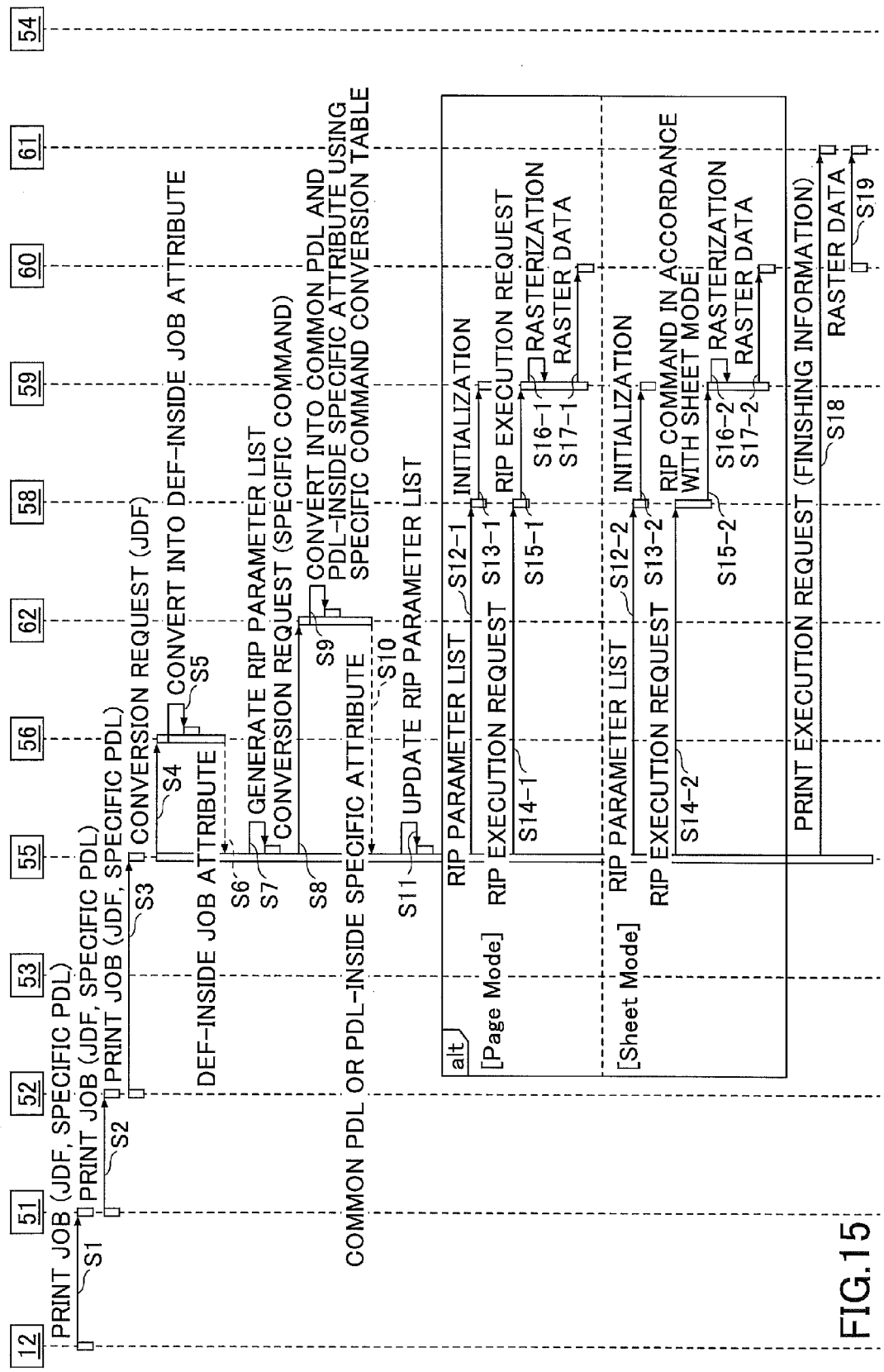
FIG. 15 is a sequence diagram illustrating an example procedure of rendering the print job by the DFE.

FIG. 15 is a sequence diagram illustrating an example procedure of rendering the print job by the DFE 32 according to an embodiment.

Step S1: The application 12 transmits a print job (JDF and PDL) to the DFE 32. The PDL includes a specific command. Therefore, the "specific PDL" is described in FIG. 15.

Step S2: The job receiving section 51 outputs the print job (JDF and PDL) to the system control section 52.

Step S3: The system control section 52 outputs the print job to the job control section 55. When the DFE 32 sets so as to store the print job into the job data storage section 53, the system control section 52 stores the print job into the job data storage section 53.

Step S4: The job control section 55 outputs the JDF and a JDF conversion request to the JDF analysis section 56.

Step S5: The JDF analysis section 56 identifies the application that has generated the JDF, and generates the "DFE inside job attribute" by using the conversion table 64 for the RIP engine that is assumed to perform rendering by the application.

Step S6: The JDF analysis section 56 outputs the "DFE inside job attribute" to the job control section 55.

Step S7: The job control section 55 generates the "RIP Parameter List" by using the "DFE inside job attribute" and the PDL. In this step, the specific command of the PDL is not reflected in the "RIP Parameter List".

Step S8: The job control section 55 outputs a conversion request along with the PDL (specific command) to the PDL conversion section 62.

Step S9: The PDL conversion section 62 converts the specific command of the PDL into the common PDL and the PDL-inside specific attribute by using the specific command conversion table 63.

Step S10: The PDL conversion section 62 outputs the common PDL and the PDL-inside specific attribute to the job control section 55.

Step S11: The job control section 55 updates the "RIP Parameter List" by using the common PDL and the PDL-inside specific attribute.

The following process differs depending on whether the "RIP control mode" is the "Page Mode" or the "Sheet Mode". First, the process in case of the "Page Mode" is described.

Step S12-1: The job control section 55 outputs the "RIP Parameter List" to the RIP control section 58.

Step S13-1: The RIP control section 58 initializes the RIP engine 59.

Step S14-1: The job control section 55 sends an RIP execution request to the RIP control section 58.

Step S15-1: The RIP control section 58 outputs the RIP command in place of the job control section 55. When the "RIP control mode" is the "Page Mode", the RIP control section 58 outputs the RIP command in a sequence appropriate for the "Page Mode".

Step S16-1: The RIP engine 59 performs rasterization.

Step S17-1: The RIP engine 59 stores the raster data into the image storage section 60.

Next, the process in case of the "Sheet Mode" is described.

Step S12-2: The job control section 55 outputs the "RIP Parameter List" to the RIP control section 58.

Step S13-2: The RIP control section 58 initializes the RIP engine 59.

Step S14-2: The job control section 55 sends the RIP execution request to the RIP control section 58.

Step S15-2: The RIP control section 58 outputs the RIP commands in a sequence in accordance with the "Sheet Mode" when the "RIP control mode" is the "Sheet Mode".

Step S16-2: The RIP engine 59 performs rasterization.

Step S17-2: The RIP engine 59 stores the raster data into the image storage section 60.

Therefore, there is no difference in the operation of the job control section 55 regardless of whether the "RIP control mode" is the "Page Mode" or the "Sheet Mode", so that the job control section 55 always operates based on the "Page Mode". The RIP control section 58 can determine the difference between the "Page Mode" or the "Sheet Mode" based on the "RIP control mode", and absorb the difference between the "Page Mode" or the "Sheet Mode".

Step S18: The job control section 55 outputs the "Finishing information" along with a print execution request to the printer control section 61. This timing may be before or after the generation of the raster data.

Step S19: Upon the receipt of the print execution request, the printer control section 61 determines the raster data to be in the image storage section 60, and performs printing.

As described above, the DFE 32 according to an embodiment can generate the "RIP Parameter List" including the print setting (attribute information) that does not include a specific command and is extracted from a specific command even when the PDL of the print job generated by the application 12 of the vendor "A" includes the specific command of the vendor "A". Therefore, it becomes possible to perform printing by not only the RIP engine of the vendor "A" but also the RIP engines of the vendors "B" and "C". For example, in a case where all the RIP engines of the vendors "A", "B", and "C" support the PostScript language, even when the PDLs of the applications include respective specific commands, it becomes possible for any of the RIP engines 59 to perform printing.

Second Embodiment

In the first embodiment, a specific command is converted into the common PDL and the PDL-inside specific attribute by using the specific command conversion table 63. In this embodiment, the DFE 32 is described that uses a function called Pre-RIP, which is provided by the RIP section 57, so as to generate the common PDL and the PDL-inside specific attribute.

Here, the term "Pre-RIP" refers to a process where the job control section 55 outputs a PDL command to the RIP control section 58 (or the RIP engine 59) without actual rendering, and acquires the attribute information (the attributes and the attribute values). The attributes that are transmitted by the RIP control section 58 are an example of the claimed "print setting information". By doing this, it becomes possible for the job control section 55 to acquire the attribute information designated by the PDL, and determine whether the RIP engine 59 corresponds to the PDL commands.

In this embodiment, by using the structure of the Pre-RIP, a specific command is detected and the common PDL or the PDL-inside specific attribute is generated based on the acquired attribute information. It does not matter, however, even when neither of the common PDL nor the PDL-inside specific attribute may be generated.

Figure 16:
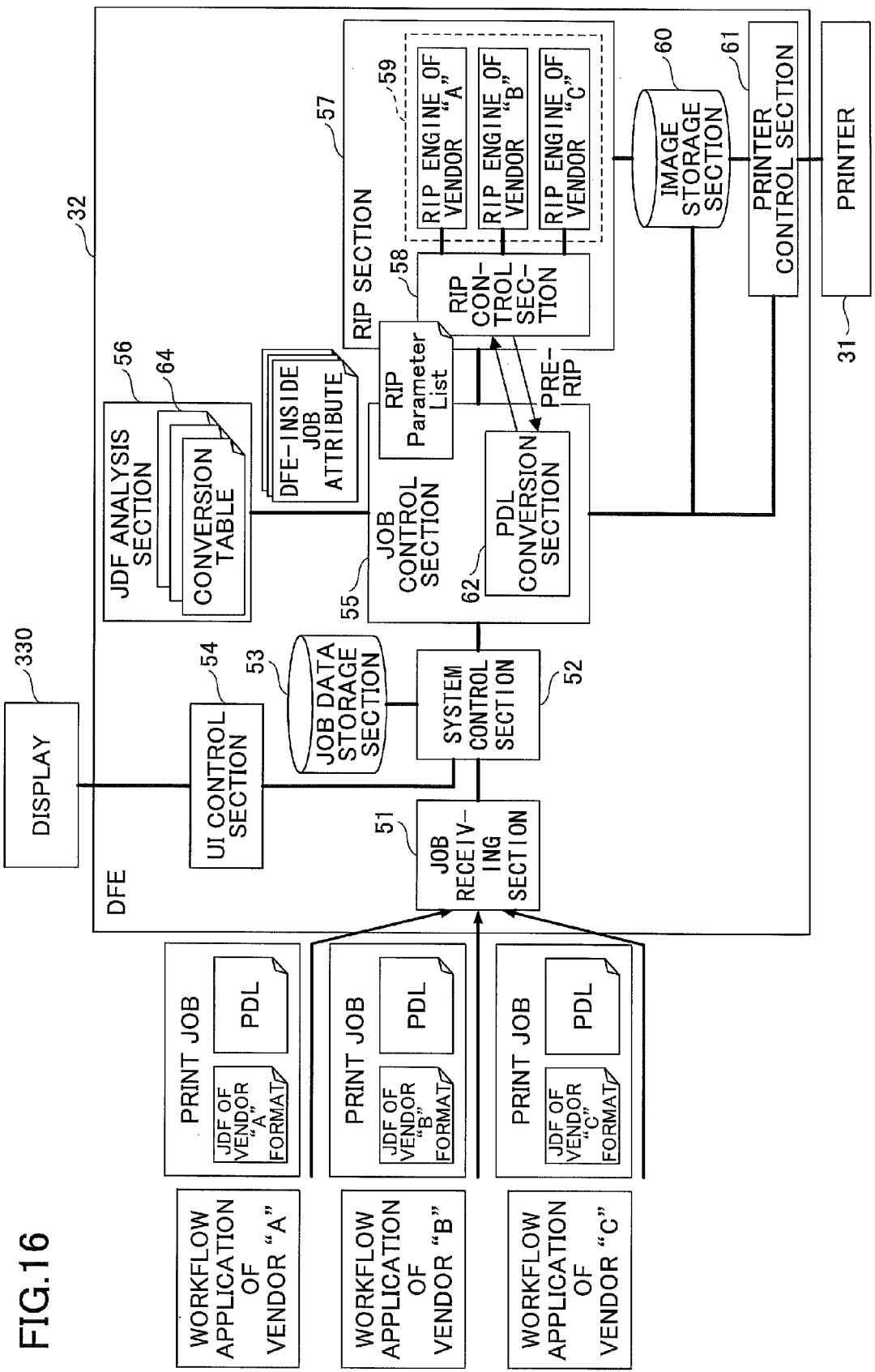
FIG. 16 is an example functional block diagram of the DFE according to an embodiment.

FIG. 16 is an example functional block diagram of the DFE 32 according to this embodiment. Here, the same reference numerals are used to describe the same or equivalent elements as those in FIG. 5, and only main elements in this embodiment may be described.

The configuration of this embodiment described herein similar to that of the first embodiment except that the PDL conversion section 62 does not have the specific command conversion table 63.

Figure 17:
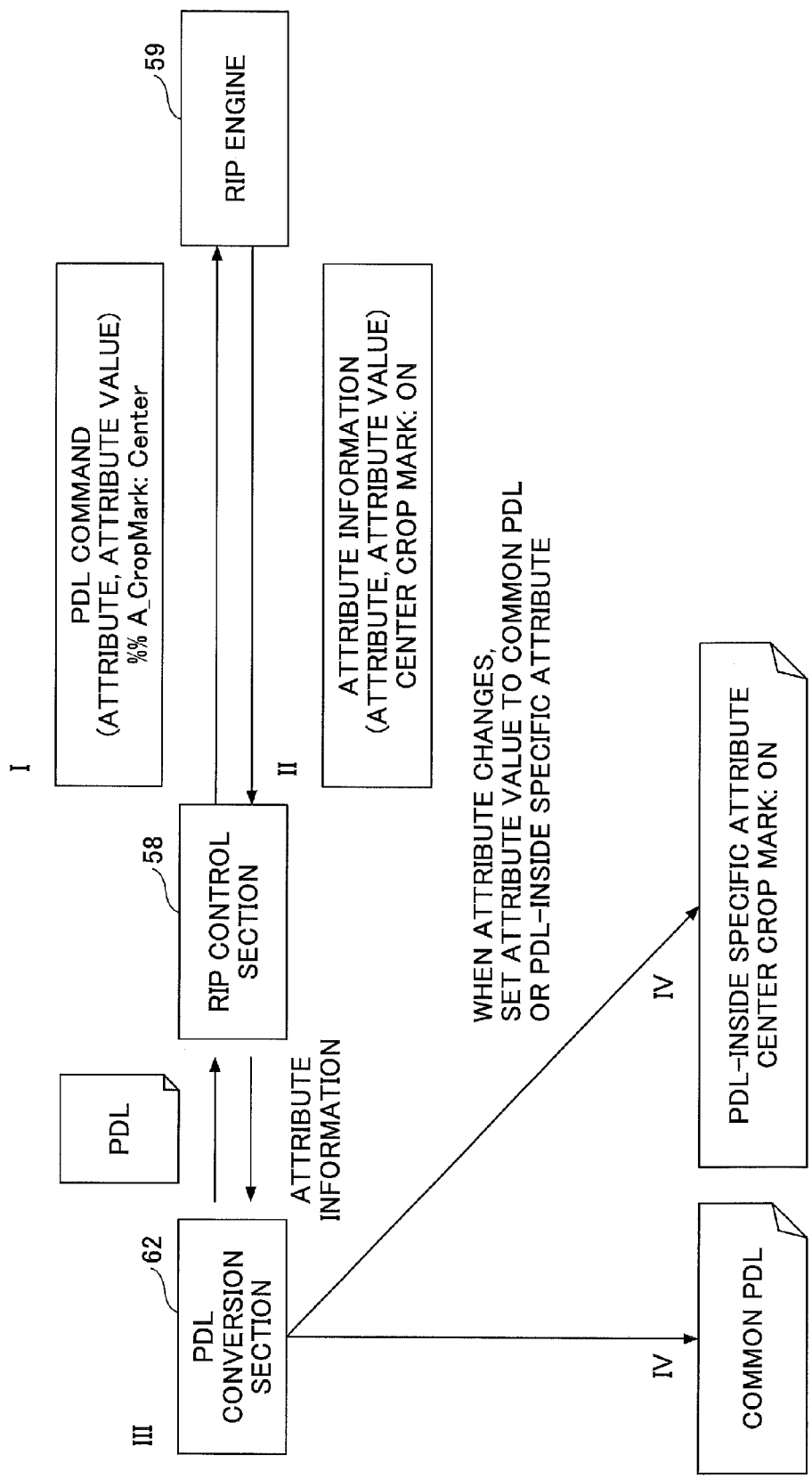
FIG. 17 is a drawing schematically illustrating conversions to common Page Description Language (PDL) and own attribute in PDL by Pre-RIP.

Conversion into the Common PDL and the PDL-Inside Specific Attribute by the Pre-RIP FIG. 17 schematically illustrates an example of the conversion from the specific command into the common PDL and the PDL-inside specific attribute by the Pre-RIP. The job control section 55 (PDL conversion section 62) outputs the PDL along with a Pre-RIP request to the RIP control section 58. By doing this, the RIP control section 58 performs the Pre-RIP and transmits the result to the PDL conversion section 62.

I. The RIP control section 58 outputs the PDL commands to the RIP engine 59 in a command basis (i.e., outputs the commands one by one or on a section basis, each section having meaning such as one function). The PDL commands includes respective attributes and attribute information.

The case of the specific command "%% A_CropMark:Center" in the first embodiment is exemplarily described. The attribute and the attribute information of the specific command "%% A_CropMark:Center" are as follows:
Attribute . . . A_CropMark
Attribute value . . . Center II. The RIP engine 59 transmits the respective attribute information (attributes and attribute values) in response to the PDL commands. The RIP engine 59 transmits the following attribute information in response to the specific command "%% A_CropMark:Center".
Attribute . . . Center Crop Mark
Attribute value . . . ON III. The PDL conversion section 62 determines that the "%% A_CropMark:Center" is the specific command because the received attribute differs from the transmitted attribute. Why such determination is possible is that the Pre-RIP is performed in order to determine the attributes of the PLD commands (to know whether the RIP engine 59 supports the attribute of the PDL) and when the RIP engine 59 supports the attribute of the PDL, the same attribute basically returns.

When the attribute of a PDL command is the same as the attribute acquired by the Pre-RIP, the PDL command can be processed by the RIP engine 59 (because the PDL command is not the specific command). Therefore, the PDL conversion section 62 does not do anything.

IV.: In the case of the specific command, the PDL conversion section 62 sets the received attribute information (attribute and attribute value) into the common PDL and the PDL-inside specific attribute. Here, it is assumed that whether to set into the common PDL or the PDL-inside specific attribute in accordance with the attribute information is determined in advance. The common PDLs are already known. Therefore, a list of the common PDLs may be stored in a table, so that the attribute information other than the common PDLs may be set into the PDL-inside specific attribute. Accordingly, the attribute value "Center Crop Mark: ON" is set into the PDL-inside specific attribute.

When it is determined that the PDL command "%% A_CropMark:Center" is the specific command, the PDL conversion section 62 deletes (removes) the specific command from the PDL because the RIP engine 59 cannot process the specific command.

Selection of the RIP Engine

In this embodiment, the DFE 32 includes the RIP engines of the vendors "A", "B", and "C". In such a case where plural RIP engines 39 are included, the PDL conversion section 62 performs the Pre-RIP by any or all the RIP engines 59.

When any RIP engine 59 is used, the RIP engine 59 that performs the Pre-RIP is selected similar to the case in the first embodiment where the RIP engine that performs rendering is selected.

i) The RIP engine 59 that is set by a user is used (selected).
ii) The RIP engine 59 is used corresponding to the conversion table 64 with which the conversion from the JDF into the "DFE inside job attribute" is performed in a good manner.

When the Pre-RIP is performed by all the RIP engines, the specific commands corresponding to the RIP engines are identified, and respective common PDLs and the PDL-inside specific attributes are acquired. In this case, the "RIP Parameter List" is generated by using the common PDL and the PDL-inside specific attribute acquired by the Pre-RIP that is performed by the RIP engine to be finally used in rendering (the RIP engine designated by a user or that provides conversion in a good manner).

Operation Procedure

Figure 18:
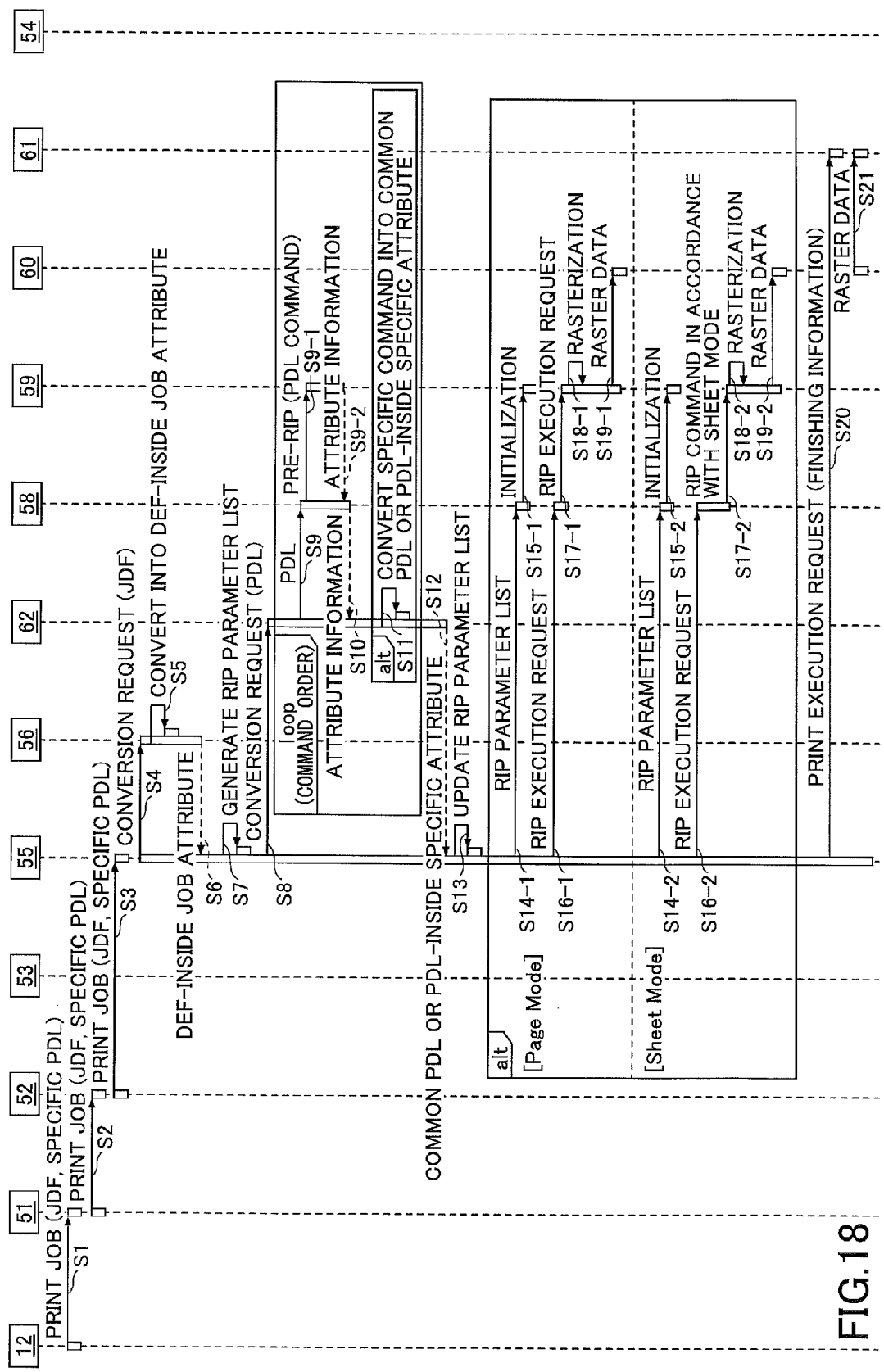
FIG. 18 is a sequence diagram illustrating an example procedure of rendering the print job by the DFE.

FIG. 18 is a sequence diagram illustrating an example procedure of rendering a print job by the DFE 32 according to this embodiment. The steps S8 through S12 differ from those in FIG. 13 in the first embodiment.

Step S1: The application 12 transmits a print job (JDF and PDL) to the DFE 32.

Step S2: The job receiving section 51 outputs the print job (JDF and PDL) to the system control section 52.

Step S3: The system control section 52 outputs the print job to the job control section 55. When the DFE 32 sets so as to store the print job into the job data storage section 53, the system control section 52 stores the print job into the job data storage section 53.

Step S4: The job control section 55 outputs the JDF and a JDF conversion request to the JDF analysis section 56.

Step S5: The JDF analysis section 56 identifies the application that has generated the JDF, and generates the "DFE inside job attribute" by using the conversion table 64 for the RIP engine that is assumed to perform rendering by the application.

Step S6: The JDF analysis section 56 outputs the "DFE inside job attribute" to the job control section 55.

Step S7: The job control section 55 generates the "RIP Parameter List" by using the "DFE inside job attribute" and the PDL. In this step, the specific command of the PDL is not reflected in the "RIP Parameter List".

Step S8: The job control section 55 outputs a conversion request along with the PDL to the PDL conversion section 62.

Step S9: The PDL conversion section 62 outputs the PDL to the RIP control section 58.

Step S9-1: The PDL conversion section 62 performs the Pre-RIP on the RIP control section 58 on a command basis. Namely, the RIP control section 58 outputs the PLD commands (attributes and attribute values) to the RIP engine 59.

Step S9-2: In response to this, the RIP engine 59 transmits the attribute information (attributes and attribute values) to the RIP control section 58.

Step S10: The RIP control section 58 transmits the attribute information (attributes and attribute values) to the PDL conversion section 62.

Step S11: When determining that the attribute is changed, the PDL conversion section 62 sets the PDL command, which is output to the RIP control section 58, into the common PDL or the PDL-inside specific attribute. Further, the PDL conversion section 62 deletes the PDL command, which is output to the RIP control section 58, from the PDL.

Step S12: The PDL conversion section 62 outputs the common PLD and the PDL-inside specific attribute to the job control section 55.

Step S13: The job control section 55 updates the "RIP Parameter List" by using the common PDL and the PDL-inside specific attribute. The processes after steps S14-1 and S14-2 are similar to those in the first embodiment. Therefore, the repeated descriptions thereof are herein omitted.

As described above, the DFE 32 can generate the "RIP Parameter List" that does not include a specific command but does include the setting extracted from the specific command similar to the first embodiment without using the specific command conversion table 63. Therefore, even when the PDL includes a specific command, it becomes possible for any of the RIP engines 59 to perform rendering.

Preferred modification

As described above, preferred embodiments are described. However, it should be noted that the present invention is not limited to the embodiments. Various modifications and replacements may be made without departing from the scope of the present invention.

For example, in FIG. 5, the DFE 32 includes all functions. However, any of the functions may be implemented in a separated apparatus that is in communication via a network. For example, the RIP engines 59 and the JDF analysis sections 56 of the vendors may be provided on a network accessible from the DFE 32.

This may also be applied to the image storage section 60 and the job data storage section 53, so that those sections may be provided on a network accessible from the DFE 32.

Further, the PDL conversion section 62 may be provided outside the DFE 32. In this case, the DFE 32 transmits the PDL to the outside PDL conversion section 62, and acquires the common PDL and the PDL-inside specific attribute from the PDL conversion section 62.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a first drawing data generation unit associated with a first vendor;
   a second drawing data generation unit associated with a second vendor, wherein each drawing data generating unit is configured to generate drawing data by using a print job that includes Page Description Language (PDL) print data and Job Definition format (JDF) setting information;
   a description detection unit configured to detect a non-standard PDL command specific to the first vendor included in the PDL print data; and
   a conversion unit configured to convert the PDL print data, the non-standard PDL command specific to the first vendor, and the JDF setting information into an instruction group executed by the second drawing data generation unit associated with the second vendor.

2. The information processing apparatus according to claim 1,
   wherein the description detection unit is configured to convert the detected non-standard PDL command specific to the first vendor into supported PDL print data, which is supported by the first and second drawing data generation units, and attribute information of the instruction group, and
   wherein the conversion unit is configured to convert the PDL print data, the supported PDL print data, the attribute information, and the JDF setting information into the instruction group.

3. The information processing apparatus according to claim 2, further comprising:
   a description conversion table in which the non-standard PDL command specific to the first vendor is associated with at least one of the supported PDL print data and the attribute information,
   wherein the description detection unit is configured to detect the non-standard PDL command specific to the first vendor included in the description conversion table from the PDL print data, and convert the non-standard PDL command specific to the first vendor into at least one of the supported PDL print data and the attribute information.

4. The information processing apparatus according to claim 2,
   wherein the first and second drawing data generation units are configured to transmit print setting information when receiving a description of a predetermined unit of the PDL print data, the print setting information being designated by the description, and wherein the description detection unit is configured to detect the description as the non-standard PDL command specific to the first vendor in a case where the print setting information which is transmitted by the first and second drawing data generation units in response to the receipt of the description of the predetermined unit of the PDL print data, differs from the description, and convert the print setting information, which is transmitted by the first and second drawing data generation units, into at least one of the supported PDL print data and the attribute information.

5. The information processing apparatus according to claim 2, further comprising:
an apparatus setting information generation unit configured to convert the JDF setting information into apparatus setting information that is handled by the information processing apparatus,
wherein the conversion unit is configured to convert the apparatus setting information, which is converted from the JDF setting information, and the PDL print data into the instruction group,
wherein the description detection unit is configured to detect the apparatus setting information from the non-standard PDL command specific to the first vendor including information that is to be included in the JDF setting information, and
wherein the conversion unit is configured to convert the apparatus setting information which is detected from the PDL print data, and the PDL print data into the instruction group.

6. The information processing apparatus according to claim 5,
wherein the conversion unit is configured to convert the PDL print data and the apparatus setting information into the instruction group and then update the instruction group by using at least one of the supported PDL print data, which is converted from the non-standard PDL command specific to the first vendor, and the attribute information.

7. The information processing apparatus according to claim 2,
wherein the non-standard PDL command specific to the first vendor can be processed by the second drawing data generation unit, and
wherein any of the first and second drawing data generation units is configured to execute the instruction group that has been converted from the PDL print data, the supported PDL print data, the attribute information, and the setting information by the conversion unit based on conversion of the non-standard PDL command specific to the first vendor into at least one of the supported PDL print data and the attribute information.

8. An information processing method operable by an information processing apparatus that includes a first drawing data generation unit associated with a first vendor and a second drawing data generation unit associated with a second vendor, wherein each drawing data generating unit is configured to generate drawing data by using a print job that includes Page Description Language (PDL) print data and Job Definition format (JDF) setting information, the method comprising:
detecting a non-standard PDL command specific to the first vendor included in the PDL print data; and
converting the PDL print data, the non-standard PDL command specific to the first vendor, and the JDF setting information into an instruction group executed by the second drawing data generation unit associated with the second vendor.

9. A non-transitory computer-readable medium embodying programmed instructions which, when executed by a processor of an information processing apparatus that includes a first drawing data generation unit associated with a first vendor and a second drawing data generation unit associated with a second vendor, wherein each drawing data generating unit is configured to generate drawing data by using a print job that includes Page Description Language (PDL) print data and Job Definition format (JDF) setting information, direct the processor to:
detect a non-standard PDL command specific to the first vendor included in the PDL print data; and
convert the PDL print data, the non-standard PDL command specific to the first vendor, and the JDF setting information into an instruction group executed by the second drawing data generation unit associated with the second vendor.

* * * * *